(12) United States Patent
Chen et al.

(10) Patent No.: US 12,127,072 B2
(45) Date of Patent: Oct. 22, 2024

(54) POSITIONING METHOD AND APPARATUS

(71) Applicant: Huawei Technologies Co., Ltd., Shenzhen (CN)

(72) Inventors: Lei Chen, Beijing (CN); Bingzhao Li, Beijing (CN); Li Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 599 days.

(21) Appl. No.: 17/214,457

(22) Filed: Mar. 26, 2021

(65) Prior Publication Data

US 2021/0219104 A1 Jul. 15, 2021

Related U.S. Application Data

(63) Continuation of application No. PCT/CN2019/105040, filed on Sep. 10, 2019.

(30) Foreign Application Priority Data

Sep. 26, 2018 (CN) .......................... 201811124455.9

(51) Int. Cl.
*H04W 4/029* (2018.01)
*G01S 5/02* (2010.01)
*G01S 5/12* (2006.01)

(52) U.S. Cl.
CPC ........... *H04W 4/029* (2018.02); *G01S 5/0236* (2013.01); *G01S 5/12* (2013.01)

(58) Field of Classification Search
CPC ....... H04W 4/80; H04W 4/023; H04W 8/005; H04W 52/245
See application file for complete search history.

(56) References Cited

U.S. PATENT DOCUMENTS

2012/0252487 A1* 10/2012 Siomina ................ H04W 24/10
  455/456.1
2016/0195601 A1 7/2016 Siomina et al.
(Continued)

FOREIGN PATENT DOCUMENTS

CN 101925104 A 12/2010
CN 102149070 A 8/2011
(Continued)

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN(Release 15)", 3GPP TS 36.305 V15.0.0, 85 pages, 3rd Generation Partnership Project, Valbonne, France (Jul. 2018).
(Continued)

*Primary Examiner* — Barry W Taylor
(74) *Attorney, Agent, or Firm* — Leydig, Voit & Mayer, Ltd.

(57) ABSTRACT

Embodiments of this application disclose a positioning method and an apparatus, to reduce a quantity of transmission points needed to calculate a position of a terminal, thereby reducing positioning calculation complexity. The method for calculating the position includes: receiving, by a terminal, positioning assistance information sent by a positioning entity, where the positioning assistance information includes a cell identity of a cell in which a to-be-measured transmission point is located, an identity of the to-be-measured transmission point, and positioning reference signal configuration information of the to-be-measured transmission point; measuring, by the terminal, the to-be-measured transmission point based on the positioning assistance information, to obtain a measurement result, where the measurement result includes positioning reference
(Continued)

signal information of the to-be-measured transmission point; and sending, by the terminal, the measurement result to a positioning entity.

16 Claims, 8 Drawing Sheets

(56) References Cited

U.S. PATENT DOCUMENTS

| | | | | |
|---|---|---|---|---|
| 2017/0006575 | A1* | 1/2017 | Cui | G01S 5/0036 |
| 2017/0230815 | A1* | 8/2017 | Yasukawa | H04W 52/02 |
| 2018/0317196 | A1* | 11/2018 | Do | H04W 24/08 |
| 2019/0075585 | A1* | 3/2019 | Deogun | H04W 72/1273 |
| 2019/0166453 | A1* | 5/2019 | Edge | G01S 5/06 |

FOREIGN PATENT DOCUMENTS

| | | |
|---|---|---|
| CN | 102196558 A | 9/2011 |
| CN | 102595450 A | 7/2012 |
| CN | 103314613 A | 9/2013 |
| CN | 103997780 A | 8/2014 |
| CN | 106714299 A | 5/2017 |
| CN | 108093360 A | 5/2018 |
| CN | 108169710 A | 6/2018 |
| CN | 104521297 B | 10/2018 |
| EP | 3113555 A1 | 1/2017 |
| WO | 2013036060 A1 | 3/2013 |
| WO | 2013169823 A1 | 11/2013 |
| WO | 2015139184 A1 | 9/2015 |
| WO | 2015139222 A1 | 9/2015 |
| WO | 2016114858 A1 | 7/2016 |
| WO | 2018063053 A1 | 4/2018 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 15)", 3GPP TS 36.331 V15.2.2, 791 pages, 3rd Generation Partnership Project, Valbonne, France (Jun. 2018).

Intel Corporation et al., "New SID: Study on NR positioning support", 3GPP TSG RAN Meeting #80, La Jolla, USA, RP-181399, 6 pages, 3rd Generation Partnership Project, Valbonne, France (Jun. 11-14, 2018).

"3rd Generation Partnership Project; Technical Specification Group Radio Access Network; NG Radio Access Network (NG-RAN); Stage 2 functional specification of User Equipment (UE) positioning in NG-RAN(Release 15)", 3GPP TS 38.305 V15.0.0, 57 pages, 3rd Generation Partnership Project, Valbonne, France (Jun. 2018).

Qualcomm Incorporated, "Introduction of Transmission Points for OTDOA in Shared Cell-ID Scenario and PRS based Terrestrial Beacon Systems", 3GPP TSG-RAN WG2 Meeting #95bis Kaohsiung, Taiwan, R2-167272, 20 pages, 3rd Generation Partnership Project, Valbonne, France (Oct. 10-14, 2016).

"3rd Generation Partnership Project; Technical Specification Group Radio Access Network; Evolved Universal Terrestrial Radio Access (E-UTRA); LTE Positioning Protocol (LPP) (Release 15)," 3GPP TS 36.355 V15.0.0, pp. 1-216, 3rd Generation Partnership Project, Valbonne, France (Jun. 2018).

* cited by examiner

POSITIONING METHOD AND APPARATUS

CROSS-REFERENCE TO RELATED APPLICATIONS

This application is a continuation of International Application No. PCT/CN2019/105040, filed on Sep. 10, 2019, which claims priority to Chinese Patent Application No. 201811124455.9, filed on Sep. 26, 2018. The disclosures of the aforementioned applications are hereby incorporated by reference in their entireties.

TECHNICAL FIELD

This application relates to the communications field, and in particular, to a positioning method and an apparatus.

BACKGROUND

Currently, positioning technologies used in a communications system include: an enhanced cell identity (ECID) positioning technology, an assisted-global navigation satellite system (A-GNSS) technology, and an observed time difference of arrival (OTDOA) technology. Relatively, in the OTDOA technology, a GNSS signal does not need to be used. By using a positioning principle similar to a GNSS, a difference between time points that positioning reference signals sent by two or more transmission points arrive at a terminal device is measured, and a position of the terminal device is calculated when a position of each transmission point is known.

In the OTDOA technology, a corresponding position estimation algorithm is used. Position information of at least three transmission points needs to be considered for the position estimation algorithm. Position coordinates of the terminal device are usually obtained by solving a hyperbolic curve equation. However, because an intersection point of a hyperbola is not unique, it is possible that the position of the terminal device cannot be obtained by using three transmission points, and a quantity of transmission points measured by the terminal device needs to be increased. Consequently, more transmission points are required for estimating the terminal device, and calculation is complex.

SUMMARY

Embodiments of this application provide a positioning method and an apparatus, to reduce a quantity of transmission points, thereby reducing positioning calculation complexity.

According to a first aspect, an embodiment of this application provides a positioning method, including: a terminal receives positioning assistance information sent by a positioning entity, where the positioning assistance information includes a cell identity of a cell in which a to-be-measured transmission point is located, an identity of the to-be-measured transmission point, and positioning reference signal configuration information of the to-be-measured transmission point. Then, the terminal parses the positioning assistance information to obtain the positioning reference signal configuration information and the to-be-measured transmission point. Then, the terminal receives a positioning reference signal sent by the to-be-measured transmission point, to obtain a positioning reference signal information and obtain a measurement result, where the measurement result includes the positioning reference signal information. Finally, the terminal sends the measurement result.

In this embodiment, the positioning entity may be an independent hardware entity or a part of a base station. When the terminal sends the measurement result, the terminal may transparently transmit the measurement result to the positioning entity, or may send the measurement result to the base station, and then the base station transfers the measurement result to the positioning entity after receiving the measurement result.

It may be understood that, in this embodiment, the positioning reference signal information may be beam information, or may be beam number information of the positioning reference signal. A specific case is not limited herein.

In the technical solution provided in this embodiment of this application, when measuring the to-be-measured transmission point, the terminal obtains the positioning reference signal information and reports the positioning reference signal information to the positioning entity, that is, a constraint condition is added for positioning the terminal by the positioning entity. When position information of the terminal is not unique, the positioning entity may determine the position information by using the positioning reference signal information. When positioning is unique, the positioning entity may check the position information to ensure accuracy of the position information.

Optionally, the positioning reference signal information includes at least one of number information of the positioning reference signal, direction information of the positioning reference signal, or angle of arrival information of the positioning reference signal.

Optionally, the positioning reference signal configuration information includes at least one of a periodicity, a frequency domain position, a time domain position, or a code domain position of the positioning reference signal.

It may be understood that information about a positioning reference signal cluster is usually defined in the positioning reference signal configuration information, and then information about each positioning reference signal is described based on the information about the positioning reference signal cluster. For example, the positioning reference signal configuration information includes information about one positioning reference signal cluster, that is, includes: a periodicity of the positioning reference signal cluster is 10 seconds, a frequency domain position is a channel 1, a time domain position is a slot 2 to a slot 5, and a code domain position is a fifth symbol to a tenth symbol. Then, the positioning reference signal cluster includes three positioning reference signals. A positioning reference signal 1 is located in the slot 3 and the sixth symbol. A positioning reference signal 2 is located in the slot 2 and the seventh symbol. A positioning reference signal 3 is located in the slot 4 and the fifth symbol.

Optionally, after receiving the positioning assistance information sent by the positioning entity, the terminal may further perform the following action: the terminal sends a positioning measurement request to a serving base station, where the positioning measurement request includes measurement gap information. Then, the terminal receives measurement configuration information sent by the serving base station. Based on this, that the terminal measures the to-be-measured transmission point based on the positioning assistance information specifically includes: the terminal obtains the to-be-measured transmission point based on the positioning assistance information. Then, the terminal measures the to-be-measured transmission point based on the measurement configuration information, to obtain the measurement result.

The measurement gap information includes at least two of a measurement periodicity, a measurement offset value, or a measurement time length. The measurement periodicity is used to indicate a periodicity of measuring the positioning reference signal by the terminal, the measurement offset value is used to indicate a timing start moment of measuring the positioning reference signal by the terminal, and the measurement time length is used to indicate duration of measuring the positioning reference signal by the terminal. For example, a measurement periodicity in which the terminal reports the positioning reference signal 1 is performing measurement once every five seconds, a measurement offset value is 0 (that is, timing starts from 0), and a measurement time length is 15 seconds for measurement (that is, 15 seconds for receiving the positioning reference signal). In this embodiment, the terminal reports a measurement time length of each positioning reference signal to the serving base station, so that the serving base station can configure more proper measurement duration for each positioning reference signal, thereby meeting a positioning measurement requirement.

Optionally, when the terminal reports the measurement gap information, the following several manners may be used. In a possible implementation, the terminal separately reports each piece of information in the measurement gap information. In a possible implementation, the terminal reports gap pattern information (which may also be referred to as a gap pattern) to the serving base station, and then the gap pattern information includes each piece of information in the measurement gap information. In an example, when the measurement gap information includes the measurement periodicity, the measurement offset value, and the measurement time length, the terminal separately reports the measurement periodicity, the measurement offset value, and the measurement time length to the serving base station, or the terminal reports the gap pattern information to the serving base station, where the gap pattern information includes the measurement periodicity, the measurement offset value, and the measurement time length.

Optionally, the terminal may send request information to the positioning entity, where the request information is used to request the positioning entity to send the positioning assistance information to the terminal.

Optionally, the terminal receives a positioning information request sent by the positioning entity, where the positioning information request triggers the terminal to send the measurement result.

According to a second aspect, an embodiment of this application provides a positioning method, including: a serving base station sends positioning assistance information to a positioning entity, where the positioning assistance information includes a cell identity of a cell in which each transmission point in a transmission point set is located, positioning reference signal configuration information of the transmission point, and a positioning reference signal information set of the transmission point, and the transmission point set includes a transmission point served by the serving base station. Then, the serving base station receives a positioning measurement request sent by a terminal, where the positioning measurement request includes measurement gap information. Finally, the serving base station sends measurement configuration information to the terminal.

In this embodiment, one serving base station manages a plurality of transmission points, that is, the serving base station serves one transmission point set. Then, before positioning, the serving base station needs to send the positioning assistance information of the transmission point set to the positioning entity. The positioning assistance information includes the cell identity of the cell in which each transmission point in the transmission point set is located, the positioning reference signal configuration information of the transmission point, and the positioning reference signal information set of the transmission point.

Specifically, the positioning reference signal information set of the transmission point includes number information of a positioning reference signal and at least one of direction information of the positioning reference signal, angle of arrival information of the positioning reference signal, or geographical position information of the positioning reference signal. The number information of the positioning reference signal, the direction information of the positioning reference signal, and the angle of arrival information of the positioning reference signal are all associated with the geographical position information of the positioning reference signal. In other words, the positioning entity may find the geographical position information of the positioning reference signal by using at least one of the number information of the positioning reference signal, the direction information of the positioning reference signal, or the angle of arrival information of the positioning reference signal. An association relationship between the number information of the positioning reference signal, the direction information of the positioning reference signal, or the angle of arrival information of the positioning reference signal and the geographical position information of the positioning reference signal may be stored in a manner of a mapping table or an association table, or may be stored in another available manner. This is not specifically limited herein.

In the technical solution provided in this embodiment of this application, the serving base station sends positioning reference signal information to the positioning entity, so that a constraint condition is added for positioning the terminal by the positioning entity. When position information of the terminal is not unique, the positioning entity may determine the position information by using the positioning reference signal information. When positioning is unique, the positioning entity may check the position information to ensure accuracy of the position information.

Optionally, the measurement gap information includes at least two of a measurement periodicity, a measurement offset value, or a measurement time length. The measurement periodicity is used to indicate a periodicity of measuring the positioning reference signal by the terminal, the measurement offset value is used to indicate a timing start moment of measuring the positioning reference signal by the terminal, and the measurement time length is used to indicate duration of measuring the positioning reference signal by the terminal. For example, a measurement periodicity in which the terminal reports a positioning reference signal 1 is performing measurement once every five seconds, a measurement offset value is 0 (that is, timing starts from 0), and a measurement time length is 15 seconds for measurement (that is, 15 seconds for receiving the positioning reference signal). In this embodiment, the terminal reports a measurement time length of each positioning reference signal to the serving base station, so that the serving base station can configure more proper measurement duration for each positioning reference signal, thereby meeting a positioning measurement requirement.

Optionally, when the terminal reports the measurement gap information, the following several manners may be used. In a possible implementation, the terminal separately reports each piece of information in the measurement gap information. In a possible implementation, the terminal reports gap pattern information (which may also be referred to as a gap pattern) to the serving base station, and then the gap pattern information includes each piece of information in the measurement gap information. In an example, when the measurement gap information includes the measurement periodicity, the measurement offset value, and the measurement time length, the terminal separately reports the measurement periodicity, the measurement offset value, and the measurement time length to the serving base station, or the terminal reports the gap pattern information to the serving base station, where the gap pattern information includes the measurement periodicity, the measurement offset value, and the measurement time length.

Optionally, the positioning reference signal configuration information includes at least one of a periodicity, a frequency domain position, a time domain position, or a code domain position of the positioning reference signal.

It may be understood that information about a positioning reference signal cluster is usually defined in the positioning reference signal configuration information, and then information about each positioning reference signal is described based on the information about the positioning reference signal cluster. For example, the positioning reference signal configuration information includes information about one positioning reference signal cluster, that is, includes: a periodicity of the positioning reference signal cluster is 10 seconds, a frequency domain position is a channel 1, a time domain position is a slot 2 to a slot 5, and a code domain position is a fifth symbol to a tenth symbol. Then, the positioning reference signal cluster includes three positioning reference signals. The positioning reference signal 1 is located in the slot 3 and the sixth symbol. A positioning reference signal 2 is located in the slot 2 and the seventh symbol. A positioning reference signal 3 is located in the slot 4 and the fifth symbol.

According to a third aspect, an embodiment of this application provides a positioning method, including: a positioning entity sends first positioning assistance information to a terminal, where the first positioning assistance information includes a cell identity of a cell in which a to-be-measured transmission point is located, an identity of the to-be-measured transmission point, and positioning reference signal configuration information of the to-be-measured transmission point. Then, the positioning entity receives a measurement result sent by the terminal, where the measurement result includes first positioning reference signal information of the to-be-measured transmission point. Finally, the positioning entity determines position information of the terminal based on the measurement result.

In this embodiment, the positioning entity may be an independent hardware entity or a part of a base station. When the terminal sends the measurement result, the terminal may transparently transmit the measurement result to the positioning entity, or may send the measurement result to the base station, and then, after the base station receives the measurement result, the positioning entity determines a geographical position of the terminal.

It may be understood that, in this embodiment, the positioning reference signal information may be beam information. A specific case is not limited herein.

In the technical solution provided in this embodiment of this application, the measurement result obtained by the positioning entity includes the positioning reference signal information, so that a constraint condition is added for positioning the terminal by the positioning entity. When the position information of the terminal is not unique, the positioning entity may determine the position information by using the positioning reference signal information. When positioning is unique, the positioning entity may check the position information to ensure accuracy of the position information.

Optionally, before positioning the terminal, the positioning entity may further receive second positioning assistance information sent by a serving base station, where for each transmission point in a transmission point set, the second positioning assistance information includes second positioning reference signal information of the transmission point and at least one of a cell identity of a cell in which the transmission point is located, an identity of the transmission point, or positioning reference signal configuration information of the transmission point, and the transmission point set includes a transmission point served by the serving base station. In this way, the positioning entity may obtain positioning reference signal information of all transmission points, so that when the terminal reports only the positioning reference signal information of the to-be-measured transmission point, the geographical position information of the terminal can be effectively positioned.

Optionally, the first positioning assistance information in the measurement result received by the positioning entity includes at least one of number information of a positioning reference signal, direction information of the positioning reference signal, or angle of arrival information of the positioning reference signal.

Optionally, the second positioning assistance information that is sent by the serving base station and received by the positioning entity includes number information of a positioning reference signal and at least one of direction information of the positioning reference signal, angle of arrival information of the positioning reference signal, or geographical position information of the positioning reference signal, and the geographical position information is associated with the direction information, the angle information, and the number information. Specifically, the number information of the positioning reference signal, the direction information of the positioning reference signal, and the angle of arrival information of the positioning reference signal are all associated with the geographical position information of the positioning reference signal. In other words, the positioning entity may find the geographical position information of the positioning reference signal by using at least one of the number information of the positioning reference signal, the direction information of the positioning reference signal, or the angle of arrival information of the positioning reference signal. An association relationship between the number information of the positioning reference signal, the direction information of the positioning reference signal, or the angle of arrival information of the positioning reference signal and the geographical position information of the positioning reference signal may be stored in a manner of a mapping table or an association table, or may be stored in another available manner. This is not specifically limited herein.

Optionally, if the positioning entity needs to actively obtain the position information of the terminal, the positioning entity sends a positioning information request to the terminal, to trigger, by using the positioning information request, the terminal to send the measurement result.

Optionally, if the terminal needs to position the terminal, the positioning entity receives request information sent by the terminal, and the request information triggers the positioning entity to send the first positioning assistance information to the terminal.

According to a fourth aspect, an embodiment of this application provides a terminal apparatus. The apparatus has a function of implementing behavior of the terminal in the first aspect, the second aspect, or the third aspect. The function may be implemented by hardware, or may be implemented by hardware executing corresponding software. The hardware or the software includes one or more modules corresponding to the function.

In a possible implementation, the apparatus includes units or modules configured to perform the steps in the first aspect, the second aspect, or the third aspect. For example, the apparatus includes: a receiving module, configured to receive positioning assistance information sent by a positioning entity, where the positioning assistance information includes a cell identity of a cell in which a to-be-measured transmission point is located, an identity of the to-be-measured transmission point, and positioning reference signal configuration information of the to-be-measured transmission point; a processing module, configured to measure the to-be-measured transmission point based on the positioning assistance information, to obtain a measurement result, where the measurement result includes positioning reference signal information of the to-be-measured transmission point; and a sending module, configured to send the measurement result.

Optionally, the apparatus further includes a storage module, configured to store a program instruction and data that are necessary for the terminal.

In a possible implementation, the apparatus includes a processor and a transceiver. The processor is configured to support the terminal in performing a corresponding function in the method provided in the first aspect, the second aspect, or the third aspect. The transceiver is configured to instruct communication between the terminal and both a serving base station and the positioning entity, for example, send information or an instruction in the foregoing methods to the serving base station or the positioning entity. Optionally, the apparatus may further include a memory. The memory is configured to be coupled to the processor, and the memory stores a program instruction and data that are necessary for the terminal.

In a possible implementation, when the apparatus is a chip in a terminal, the chip includes a processing module and a transceiver module. The processing module may be, for example, a processor. The processor is configured to: measure the to-be-measured transmission point based on the positioning assistance information, to obtain the measurement result, where the measurement result includes the positioning reference signal information of the to-be-measured transmission point; and perform processing such as encapsulation on the measurement result according to a protocol, to generate a data packet. The transceiver module may be, for example, an input/output interface, a pin, or a circuit in the chip, and transfers, to another chip or module coupled to the chip, the measurement result data packet generated by the processor. The processing module may execute a computer-executable instruction stored in a storage unit, to support the terminal in performing the method provided in the first aspect, the second aspect, or the third aspect. Optionally, the storage unit may be a storage unit in the chip, for example, a register or a cache. The storage unit may alternatively be a storage unit outside the chip, for example, a read-only memory (ROM), another type of static storage device that can store static information and an instruction, or a random access memory (RAM).

In a possible implementation, the apparatus includes a processor, a baseband circuit, a radio frequency circuit, and an antenna. The processor is configured to control functions of various circuit parts. The baseband circuit is configured to generate the measurement result that includes signaling information. The measurement result is sent to the positioning entity through the antenna after being processed by the radio frequency circuit through processing such as analog conversion, filtering, amplification, and up-conversion. Alternatively, the baseband circuit is configured to generate a positioning measurement request that includes measurement gap information. The positioning measurement request is sent to the serving base station through the antenna after being processed by the radio frequency circuit through processing such as analog conversion, filtering, amplification, and up-conversion. Optionally, the apparatus further includes a memory. The memory stores a program instruction and data that are necessary for the terminal.

The processor mentioned anywhere above may be a general-purpose central processing unit (CPU), a microprocessor, an application-specific integrated circuit (ASIC), or one or more integrated circuits configured to control program execution in the positioning methods in the foregoing aspects.

According to a fifth aspect, an embodiment of this application provides a serving base station. The serving base station has a function of implementing behavior of the serving base station in the first aspect, the second aspect, or the third aspect. The function may be implemented by hardware, or may be implemented by hardware executing corresponding software. The hardware or the software includes one or more modules corresponding to the function.

In a possible implementation, the apparatus includes units or modules configured to perform the steps in the first aspect, the second aspect, or the third aspect. For example, the apparatus includes: a sending module, configured to send positioning assistance information to a positioning entity, where for each transmission point in a transmission point set, the positioning assistance information includes positioning reference signal information of the transmission point and at least one of a cell identity of a cell in which the transmission point is located, an identity of the transmission point, or positioning reference signal configuration information of the transmission point, and the transmission point set includes a transmission point served by the serving base station; and a receiving module, configured to receive a positioning measurement request sent by a terminal, where the positioning measurement request includes measurement gap information. The sending module is configured to send measurement configuration information to the terminal.

Optionally, the apparatus further includes a storage module, configured to store a program instruction and data that are necessary for the serving base station.

In a possible implementation, the apparatus includes a processor and a transceiver. The processor is configured to support the serving base station in performing a corresponding function in the method provided in the first aspect, the second aspect, or the third aspect. The transceiver is configured to: instruct communication between the serving base station and both the terminal and the positioning entity, and send information or an instruction in the foregoing methods to the terminal or the positioning entity. Optionally, the apparatus may further include a memory. The memory is configured to be coupled to the processor, and the memory stores a program instruction and data that are necessary for the serving base station.

In a possible implementation, when the apparatus is a chip in a serving base station, the chip includes a processing module and a transceiver module. The processing module may be, for example, a processor. The processor is configured to obtain the positioning assistance information, and may perform processing such as encapsulation on the positioning assistance information according to a protocol. The transceiver module may be, for example, an input/output interface, a pin, or a circuit in the chip, and transfers, to another chip or module coupled to the chip, the positioning assistance information generated by the processor. The processing module may execute a computer-executable instruction stored in a storage unit, to support the station in performing the method provided in the first aspect, the second aspect, or the third aspect. Optionally, the storage unit may be a storage unit in the chip, for example, a register or a cache. The storage unit may alternatively be a storage unit outside the chip, for example, a read-only memory (ROM), another type of static storage device that can store static information and an instruction, or a random access memory (RAM).

In a possible implementation, the apparatus includes a processor, a baseband circuit, a radio frequency circuit, and an antenna. The processor is configured to control functions of various circuit parts. The baseband circuit is configured to generate the positioning assistance information that includes signaling information. The positioning assistance information is sent to the positioning entity through the antenna after being processed by the radio frequency circuit through processing such as analog conversion, filtering, amplification, and up-conversion. Alternatively, the baseband circuit is configured to generate the measurement configuration information that includes signaling information. The measurement configuration information is sent to the terminal through the antenna after being processed by the radio frequency circuit through processing such as analog conversion, filtering, amplification, and up-conversion. Optionally, the apparatus further includes a memory. The memory stores a program instruction and data that are necessary for the serving base station.

The processor mentioned anywhere above may be a general-purpose central processing unit (CPU), a microprocessor, an application-specific integrated circuit (ASIC), or one or more integrated circuits configured to control program execution in the positioning methods in the foregoing aspects.

According to a sixth aspect, an embodiment of this application provides a positioning entity. The apparatus has a function of implementing behavior of the positioning entity in the first aspect, the second aspect, or the third aspect. The function may be implemented by hardware, or may be implemented by hardware executing corresponding software. The hardware or the software includes one or more modules corresponding to the function.

In a possible implementation, the apparatus includes units or modules configured to perform the steps in the first aspect, the second aspect, or the third aspect. For example, the apparatus includes: a sending module, configured to send first positioning assistance information to a terminal, where the first positioning assistance information includes a cell identity of a cell in which a to-be-measured transmission point is located, an identity of the to-be-measured transmission point, and positioning reference signal configuration information of the to-be-measured transmission point; a receiving module, configured to receive a measurement result, where the measurement result includes first positioning reference signal information of the to-be-measured transmission point; and a processing module, configured to determine position information of the terminal based on the measurement result.

Optionally, the apparatus further includes a storage module, configured to store a program instruction and data that are necessary for the positioning entity.

In a possible implementation, the apparatus includes a processor and a transceiver. The processor is configured to support the positioning entity in performing a corresponding function in the method provided in the first aspect, the second aspect, or the third aspect. The transceiver is configured to: instruct communication between the positioning entity and both a serving base station and the terminal, and send information or an instruction in the foregoing methods to the serving base station or the terminal. Optionally, the apparatus may further include a memory. The memory is configured to be coupled to the processor, and the memory stores a program instruction and data that are necessary for the positioning entity.

In a possible implementation, when the apparatus is a chip in a positioning entity, the chip includes a processing module and a transceiver module. The processing module may be, for example, a processor. The processor is configured to generate positioning assistance information. The transceiver module may be, for example, an input/output interface, a pin, or a circuit in the chip, and transfers, to another chip or module coupled to the chip, the positioning assistance information generated by the processor. The processing module may execute a computer-executable instruction stored in a storage unit, to support the positioning entity in performing the method provided in the first aspect, the second aspect, or the third aspect. Optionally, the storage unit may be a storage unit in the chip, for example, a register or a cache. The storage unit may alternatively be a storage unit outside the chip, for example, a read-only memory (ROM), another type of static storage device that can store static information and an instruction, or a random access memory (RAM).

In a possible implementation, the apparatus includes a processor, a baseband circuit, a radio frequency circuit, and an antenna. The processor is configured to control functions of various circuit parts. The baseband circuit is configured to generate the positioning assistance information that includes signaling information. The positioning assistance information is sent to the terminal through the antenna after being processed by the radio frequency circuit through processing such as analog conversion, filtering, amplification, and up-conversion. Optionally, the apparatus further includes a memory. The memory stores a program instruction and data that are necessary for the positioning entity.

The processor mentioned anywhere above may be a general-purpose central processing unit (CPU), a microprocessor, an application-specific integrated circuit (ASIC), or one or more integrated circuits configured to control program execution in the positioning methods in the foregoing aspects.

According to a seventh aspect, this application provides a chip system. The chip system includes a processor, configured to implement functions in the foregoing aspects, for example, generate or process data and/or information in the foregoing methods. In a possible design, the chip system further includes a memory. The memory is configured to store a program instruction and data that are necessary, to implement functions in any one of the foregoing aspects. The chip system may include a chip, or may include a chip and another discrete component.

In a possible implementation, when running on the terminal side, the chip system may support the terminal in performing the method provided in the first aspect, the second aspect, or the third aspect.

In another possible implementation, when running on the serving base station side, the chip system may support the serving base station in performing the method provided in the first aspect, the second aspect, or the third aspect.

In still another possible implementation, when running on the positioning entity side, the chip system may support the positioning entity in performing the method provided in the first aspect, the second aspect, or the third aspect.

According to an eighth aspect, an embodiment of this application provides a positioning system. The system includes the terminal, the positioning entity, and the serving base station in the foregoing aspects.

According to a ninth aspect, an embodiment of this application provides a computer-readable storage medium. The computer storage medium stores a computer instruction, and the computer instruction is used to perform the method in any one of the foregoing aspects.

According to a tenth aspect, an embodiment of this application provides a computer program product including an instruction. When the computer program product runs on a computer, the computer is enabled to perform the method in any one of the foregoing aspects.

DESCRIPTION OF EMBODIMENTS

Embodiments of this application provide a positioning method and an apparatus, to reduce a quantity of transmission points, thereby reducing positioning calculation complexity.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

Figure 1:
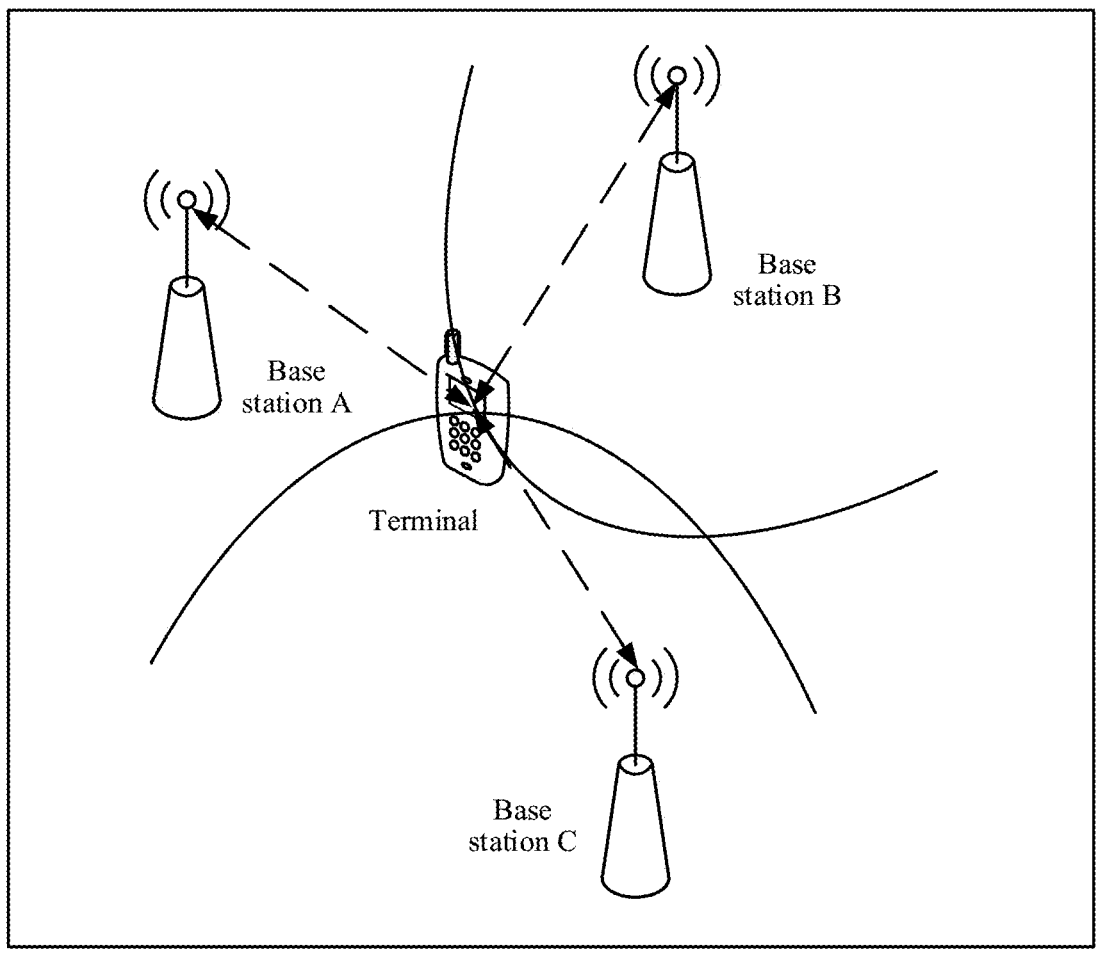
FIG. 1 is an example diagram of a positioning principle of an OTDOA technology according to an embodiment of this application.
Figure 2:
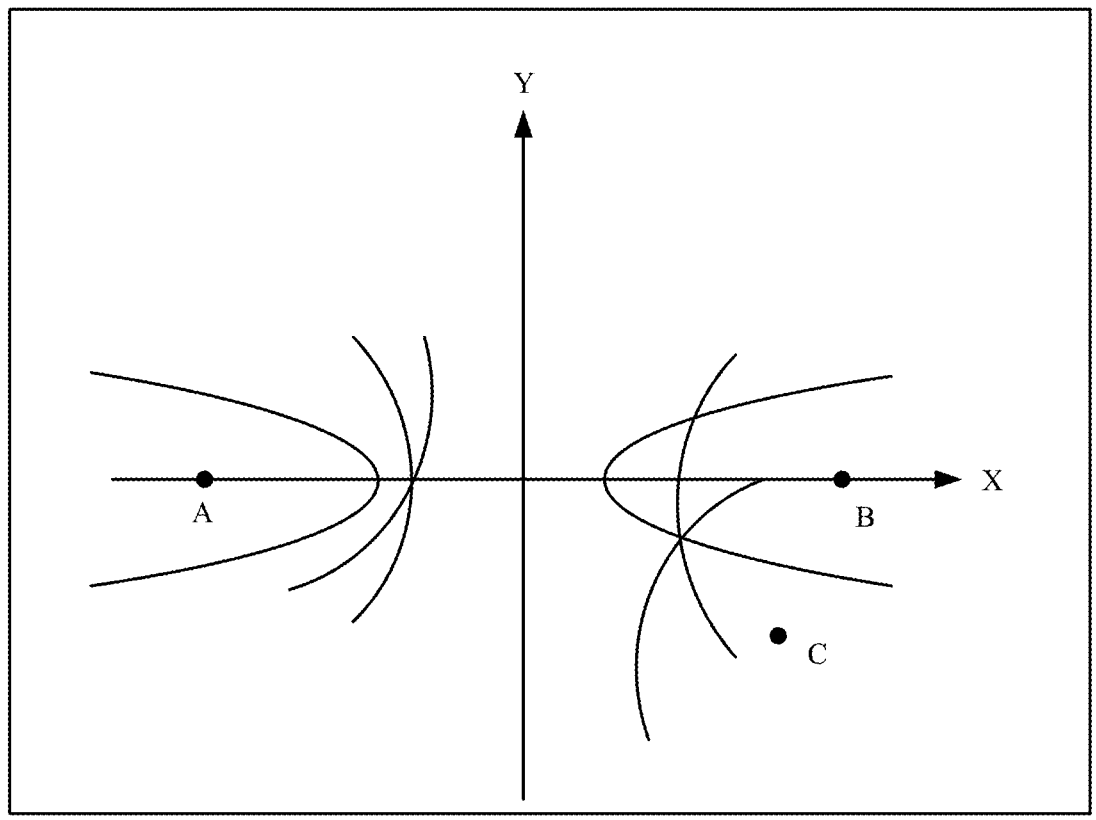
FIG. 2 is an example diagram of hyperbolic positioning according to an embodiment of this application.

Currently, positioning technologies used in a communications system include the following several manners: an ECID, an A-GNSS, and an OTDOA. Relatively, in an OTDOA technology, a GNSS signal does not need to be used. By using a positioning principle similar to a GNSS, a difference between time points that positioning reference signals sent by two or more transmission points arrive at a terminal device is measured, and a position of the terminal device is calculated when a position of each transmission point is known. As shown in FIG. 1, the terminal determines a position of the terminal by measuring a time difference that respective reference signals of a base station A, a base station B, and a base station C arrive at the terminal. In the OTDOA technology, a corresponding position estimation algorithm is used. Position information of at least three transmission points needs to be considered for the position estimation algorithm. Position coordinates of the terminal device are usually obtained by solving a hyperbolic curve equation. For example, as shown in FIG. 2, it is determined that position coordinates of the base station A are $(x_1, y_1)$, a position of the base station B is $(x_2, y_2)$, and a position of the base station C is $(x_3, y_3)$. For any point $(x, y)$, assuming that times of transmitting signals from the base station A, the base station B, and the base station C to the point are respectively t1, t2, and t3, the following two hyperbolic curve equations may be established:

$$\sqrt[2]{(x_1-x)^2+(y_1-y)^2} - \sqrt[2]{(x_2-x)^2+(y_2-y)^2} = c(t_1-t_2)$$
$$\sqrt[2]{(x_3-x)^2+(y_3-y)^2} - \sqrt[2]{(x_1-x)^2+(y_1-y)^2} = c(t_3-t_1)$$

Then, the hyperbolic curve equations are solved to obtain coordinates of the point $(x, y)$. However, because an intersection point of a hyperbola is not unique, it is possible that the position of the terminal device (namely, the point $(x, y)$) cannot be obtained by using three transmission points, and a quantity of transmission points measured by the terminal device needs to be increased. Consequently, more transmission points are required for estimating the terminal device, and calculation is complex.

To resolve this problem, the embodiments of this application provide the following solution: a terminal receives positioning assistance information sent by a positioning entity, where the positioning assistance information includes a cell identity of a cell in which a to-be-measured transmission point is located, an identity of the to-be-measured transmission point, and positioning reference signal configuration information of the to-be-measured transmission point. Then, the terminal parses the positioning assistance information to obtain the positioning reference signal configuration information and the to-be-measured transmission point. Then, the terminal receives a positioning reference signal sent by the to-be-measured transmission point, to obtain a positioning reference signal information and obtain a measurement result, where the measurement result includes the positioning reference signal information. Finally, the terminal sends the measurement result.

Figure 3:
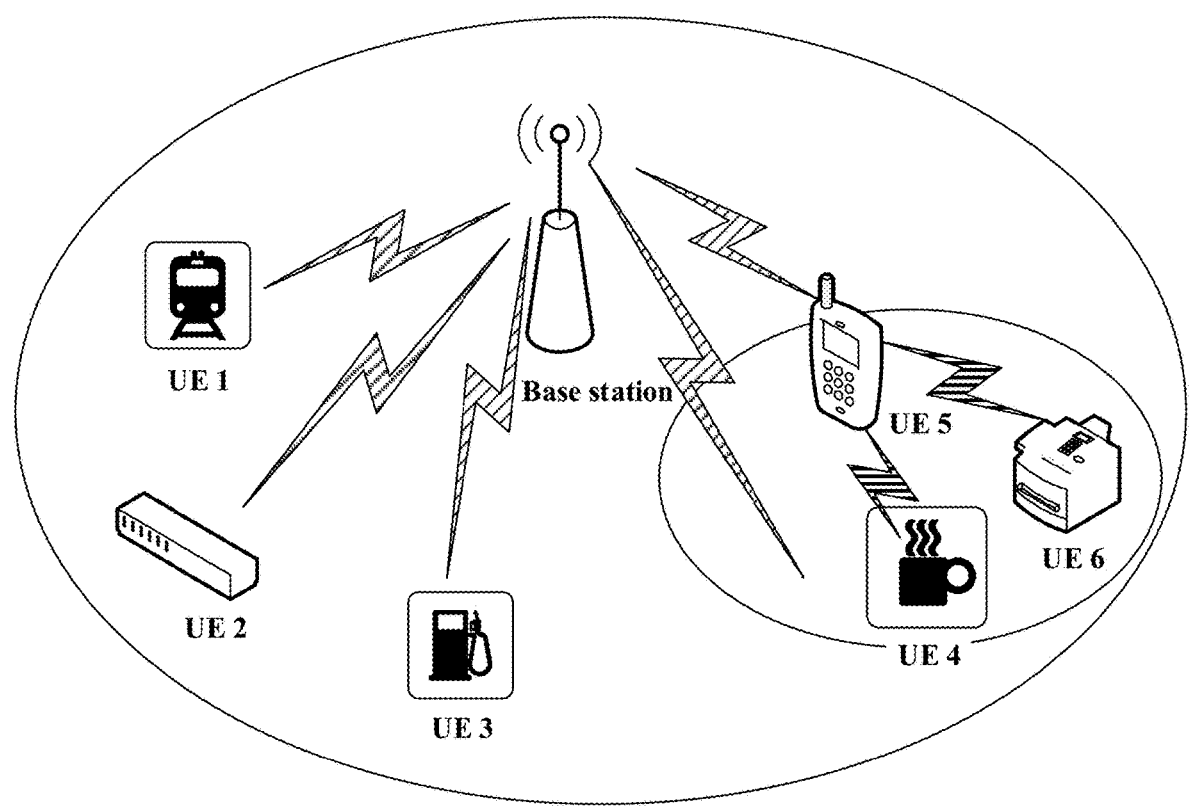
FIG. 3 is a schematic diagram of a positioning application scenario according to an embodiment of this application.

The embodiments of this application are mainly used in a 5G new radio access technology (new RAT, NR) system, and may also be used in other communication, provided that the communications system includes a first entity that may send transmission direction indication information and a second entity that receives the indication information, and the second entity may determine a transmission direction within a period of time based on the indication information. For example, FIG. 3 shows an application scenario according to an embodiment of this application. In this system architecture, a communications system includes a base station and user equipment (UE), and the UEs includes UE 1 to UE 6. In the communications system, the UE 1 to the UE 6 may send uplink data to the base station, and the base station receives the uplink data sent by the UE 1 to the UE 6. In addition, a communications system may alternatively include the UE 4 to the UE 6. In the communications system, the base station may send downlink data to the UE 1, the UE 2, the UE 3, and the UE 5. The UE 5 may also send downlink information to the UE 4 and the UE 6.

Figure 4:
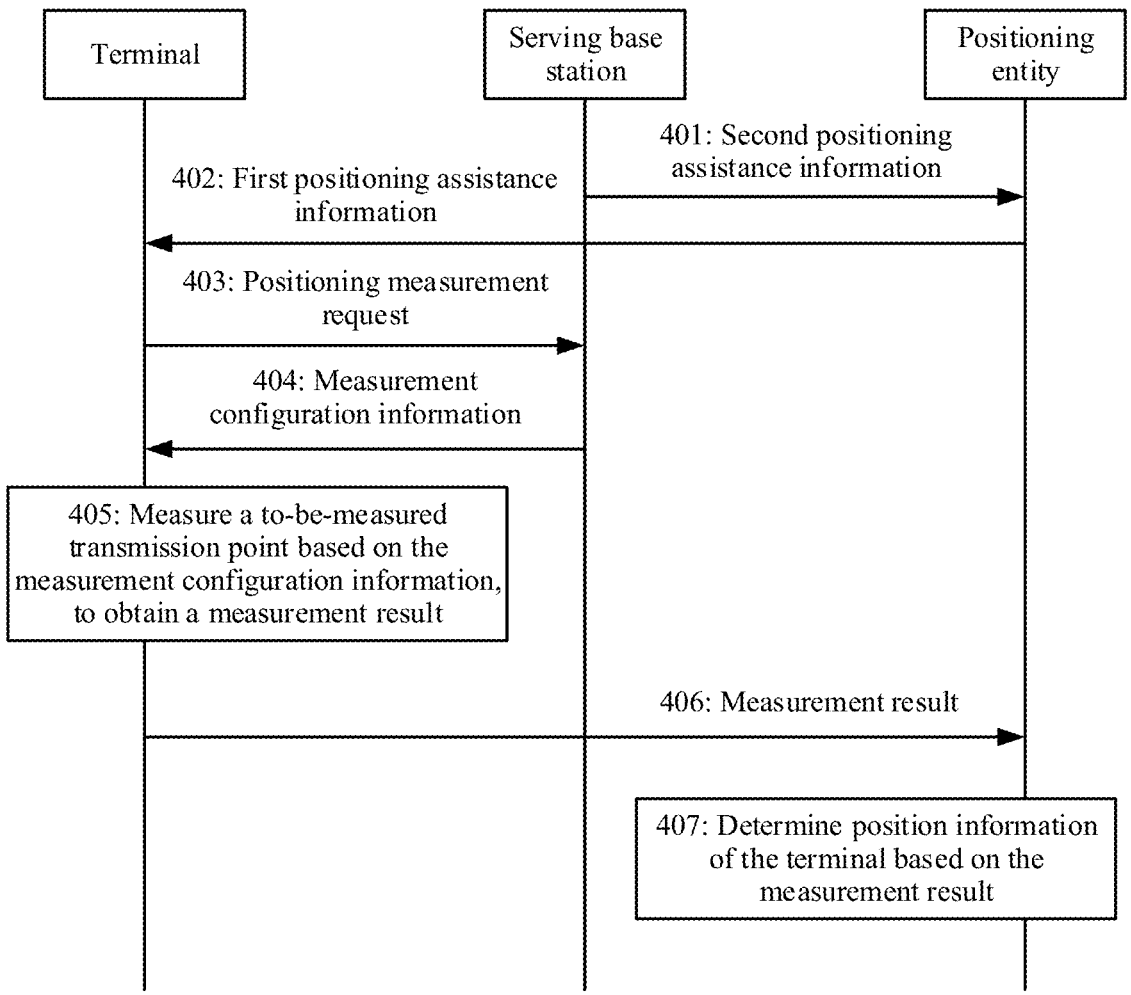
FIG. 4 is a schematic diagram of an embodiment of a positioning method according to an embodiment of this application.

Specifically, referring to FIG. 4, an embodiment of a positioning method in the embodiments of this application includes the following steps.

401: A serving base station sends second positioning assistance information to a positioning entity, where the second positioning assistance information includes a cell identity of a cell in which each transmission point in a transmission point set is located, positioning reference signal configuration information of the transmission point, an identity of the transmission point, and a positioning reference signal information set of the transmission point.

In this embodiment, one serving base station manages a plurality of transmission points, that is, the serving base station serves one transmission point set. Then, before positioning, the serving base station needs to send the second positioning assistance information of the transmission point set to the positioning entity. The second positioning assistance information includes the cell identity of the cell in which each transmission point in the transmission point set is located, the positioning reference signal configuration information of the transmission point, the identity of the transmission point, and the positioning reference signal information set of the transmission point.

Specifically, the positioning reference signal information set of the transmission point includes number information of a positioning reference signal and at least one of direction information of the positioning reference signal, angle of arrival information of the positioning reference signal, or geographical position information of the positioning reference signal. The number information of the positioning reference signal, the direction information of the positioning reference signal, and the angle of arrival information of the positioning reference signal are all associated with the geographical position information of the positioning reference signal. Specifically, the positioning entity may find the geographical position information of the positioning reference signal by using at least one of the number information of the positioning reference signal, the direction information of the positioning reference signal, or the angle of arrival information of the positioning reference signal. An associa-tion relationship between the number information of the positioning reference signal, the direction information of the positioning reference signal, or the angle of arrival information of the positioning reference signal and the geographical position information of the positioning reference signal may be stored in a manner of a mapping table or an association table, or may be stored in another available manner. This is not specifically limited herein. An example is used below for description. Assuming that a transmission point 1 includes three positioning reference signals, a positioning reference signal information set of the transmission point 1 may be shown in Table 1.

TABLE 1

| Number information of a positioning reference signal | Direction information of the positioning reference signal | Geographic position information of the positioning reference signal |
| --- | --- | --- |
| 1 | North-east | Position A |
| 2 | East | Position B |
| 3 | South | Position C |

Optionally, the positioning reference signal configuration information includes at least one of a periodicity, a frequency domain position, a time domain position, or a code domain position of the positioning reference signal.

It may be understood that information about a positioning reference signal cluster is usually defined in the positioning reference signal configuration information, and then information about each positioning reference signal is described based on the information about the positioning reference signal cluster. For example, the positioning reference signal configuration information includes information about one positioning reference signal cluster, that is, includes: A periodicity of the positioning reference signal cluster is 10 seconds, a frequency domain position is a channel 1, a time domain position is a slot 2 to a slot 5, and a code domain position is a fifth symbol to a tenth symbol. Then, the positioning reference signal cluster includes three positioning reference signals. A positioning reference signal 1 is located in the slot 3 and the sixth symbol. A positioning reference signal 2 is located in the slot 2 and the seventh symbol. A positioning reference signal 3 is located in the slot 4 and the fifth symbol.

It may be understood that, in this embodiment, for differentiation, positioning assistance information sent by the serving base station to the positioning entity is denoted as the second positioning assistance information, and positioning assistance information sent by the positioning entity to a terminal is denoted as first positioning assistance information. That is, the second positioning assistance information is equivalent to the positioning assistance information sent by the serving base station to the positioning entity in the claims, and the first positioning assistance information is equivalent to the positioning assistance information sent by the positioning entity to the terminal in the claims. In this embodiment, the first positioning assistance information and the second positioning assistance information are used for description. In this embodiment, positioning reference signal information may be beam information. A specific case is not limited herein.

In this application, "at least one" means one or more, and "a plurality of" means two or more. The term "and/or" is used to describe an association relationship between associated objects and indicates that three relationships may exist. For example, A and/or B may indicate the following cases: only A exists, both A and B exist, and only B exists, where A and B may be singular or plural. The character "/" usually indicates an "or" relationship between the associated objects. "At least one (piece) of the following" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

402: The positioning entity sends the first positioning assistance information to the terminal, where the first positioning assistance information includes a cell identity of a cell in which a to-be-measured transmission point is located and positioning reference signal configuration information of the to-be-measured transmission point, and the to-be-measured transmission point is included in the transmission point set.

When needing to position the terminal, the positioning entity sends the first positioning assistance information to the terminal, where the first positioning assistance information includes the cell identity of the cell in which the to-be-measured transmission point is located, an identity of the to-be-measured transmission point, and the positioning reference signal configuration information of the to-be-measured transmission point.

Optionally, when the positioning entity sends the first positioning assistance information to the terminal, the following several possible manners may be used.

In a possible implementation, the positioning entity directly triggers an action of sending the first positioning assistance information, that is, the positioning entity actively sends the first positioning assistance information to the terminal.

In a possible implementation, the positioning entity sends the first positioning assistance information to the terminal after receiving request information of the terminal.

The first positioning assistance information further includes measurement time information of the to-be-measured transmission point.

403: The terminal sends a positioning measurement request to the serving base station, where the positioning measurement request includes a measurement gap request.

After receiving the first positioning assistance information, the terminal parses the first positioning assistance information to obtain the cell identity of the cell in which the to-be-measured transmission point is located and the positioning reference signal configuration information of the to-be-measured transmission point. When a trigger condition is met, the terminal sends the positioning measurement request to the serving base station, where the positioning measurement request includes the measurement gap request.

In this embodiment, the terminal may send the measurement gap request to the serving base station in the following several possible manners.

In a possible implementation, the terminal may actively send the measurement gap request to the serving base station.

In another possible implementation, the terminal sends the measurement gap request to the serving base station after receiving a positioning request sent by the positioning entity.

It may be understood that the foregoing two manners may be used based on different application scenarios. For example, when the terminal needs to obtain position information of the terminal, the terminal may directly send the measurement gap request to the serving base station; or when a third party (for example, the positioning entity or another terminal) needs to obtain position information of the terminal, the terminal may send the measurement gap request to the serving base station after receiving the positioning request sent by the positioning entity.

Optionally, the measurement gap request includes at least two of a measurement periodicity, a measurement offset value, or a measurement time length.

The measurement periodicity is used to indicate a periodicity of measuring the positioning reference signal by the terminal, the measurement offset value is used to indicate a timing start moment of measuring the positioning reference signal by the terminal, and the measurement time length is used to indicate duration of measuring the positioning reference signal by the terminal. For example, a measurement periodicity in which the terminal reports the positioning reference signal 1 is performing measurement once every five seconds, a measurement offset value is 0 (that is, timing starts from 0, and a measurement time length is 15 seconds for measurement (that is, 15 seconds for receiving the positioning reference signal). In this embodiment, the terminal reports a measurement time length of each positioning reference signal to the serving base station, so that the serving base station can configure more proper measurement duration for each positioning reference signal, thereby meeting a positioning measurement requirement.

Optionally, when the terminal reports the measurement gap information, the following several manners may be used. In a possible implementation, the terminal separately reports each piece of information in the measurement gap information. In a possible implementation, the terminal reports gap pattern information to the serving base station, and then the gap pattern information includes each piece of information in the measurement gap information. In an example, when the measurement gap information includes the measurement periodicity, the measurement offset value, and the measurement time length, the terminal separately reports the measurement periodicity, the measurement offset value, and the measurement time length to the serving base station, or the terminal reports the gap pattern information to the serving base station, where the gap pattern information includes the measurement periodicity, the measurement offset value, and the measurement time length.

404: The serving base station sends measurement configuration information to the terminal.

After receiving the measurement gap request sent by the terminal, the serving base station configures the corresponding measurement configuration information for the terminal based on a basic parameter in the measurement gap request, and sends the measurement configuration information to the terminal.

405: The terminal measures the to-be-measured transmission point based on the measurement configuration information, to obtain a measurement result, where the measurement result includes positioning reference signal information of the to-be-measured transmission point.

After receiving the measurement configuration information, the terminal receives a positioning reference signal sent by the to-be-measured transmission point, measures the positioning reference signal, and obtains the positioning reference signal information. Then, the terminal generates the measurement result, where the measurement result includes the positioning reference signal information of the to-be-measured transmission point. The measurement result may further include the cell identity of the cell in which the to-be-measured transmission point is located and the identity of the to-be-measured transmission point. The positioning reference signal information may include at least one of a number of the positioning reference signal, direction information of the positioning reference signal, or angle information of the positioning reference signal.

It may be understood that each transmission point may include a plurality of positioning reference signals. However, when receiving one or more positioning reference signal of the transmission point, the terminal may receive only a part of positioning reference signals of the transmission point. Because the positioning entity may obtain all positioning reference signal information of the transmission point, the terminal may report only a number of one or more positioning reference signal which can be measured. Optionally, the terminal may alternatively directly report all information about the positioning reference signal which can be measured. For example, it is assumed that a transmission point 2 has five positioning reference signals. Specific information is as follows: a direction of a positioning reference signal 1 is 30 degrees northward, a direction of a positioning reference signal 2 is 20 degrees eastward, a direction of a positioning reference signal 3 is due east, a direction of a positioning reference signal 4 is due south, and a direction of a positioning reference signal 5 is due west. When measuring a positioning reference signal of the transmission point 2, the positioning reference signal 3 is measured by the terminal. In this case, the terminal may directly report a number "3" of the positioning reference signal 3 to the positioning entity, or may report a number and direction information of the positioning reference signal 3 to the positioning entity.

406: The terminal sends the measurement result to the positioning entity.

The terminal sends the measurement result obtained through measurement to the positioning entity.

It may be understood that, in this embodiment, the positioning entity may be an independent hardware entity or a part of a base station. When the terminal sends the measurement result, the terminal may transparently transmit the measurement result to the positioning entity, or may send the measurement result to the base station, and then the base station transfers the measurement result to the positioning entity after receiving the measurement result.

407: The positioning entity determines the position information of the terminal based on the measurement result.

The positioning entity determines the position information of the terminal based on the measurement result after receiving the measurement result.

In this embodiment, the positioning entity may feedback the position information of the terminal to the terminal or a third party after obtaining the position information of the terminal.

In this embodiment, when measuring the to-be-measured transmission point, the terminal obtains the positioning reference signal information of the positioning reference signal that carries a reference signal, and reports the positioning reference signal information to the positioning entity, that is, a constraint condition is added for positioning the terminal by the positioning entity. When the position information of the terminal is not unique, the positioning entity may determine the position information by using the positioning reference signal information. When positioning is unique, the positioning entity may check the position information to ensure accuracy of the position information. In addition, when the terminal reports the measurement gap request, the measurement time length is increased, so that the transmission point can configure a more proper gap parameter for the terminal, thereby meeting a positioning measurement requirement.

The foregoing describes the positioning method in the embodiments of this application. The following describes an apparatus in the embodiments of this application.

Figure 5:
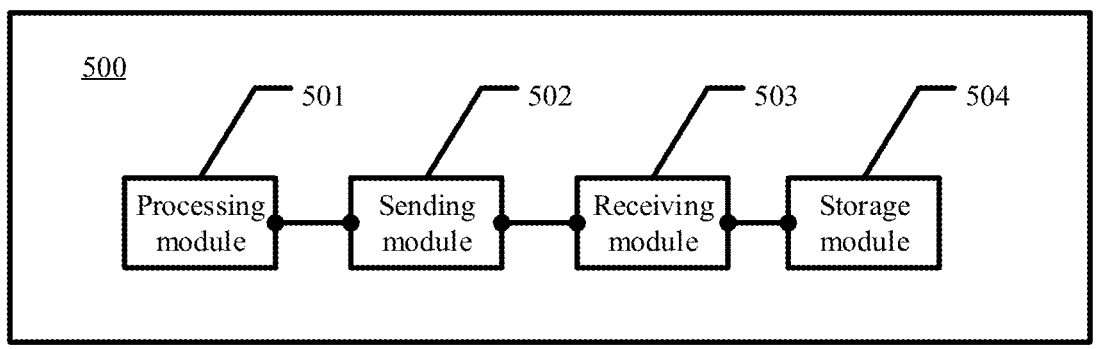
FIG. 5 is a schematic diagram of an embodiment of a terminal according to an embodiment of this application.

Specifically, referring to FIG. 5, a terminal 500 in an embodiment of this application includes a processing module 501, a sending module 502, and a receiving module 503. The terminal 500 may be the terminal in the foregoing method embodiment, or may be one or more chips in the terminal. The terminal 500 may be configured to perform some or all functions of the terminal in the foregoing method embodiment.

For example, the receiving module 503 may be configured to perform step 402 and step 404 in the foregoing method embodiment. For example, the receiving module 503 receives positioning assistance information sent by a positioning entity, where the positioning assistance information includes a cell identity of a cell in which a to-be-measured transmission point is located, an identity of the to-be-measured transmission point, and positioning reference signal configuration information of the to-be-measured transmission point. The processing module 501 may be configured to perform step 405 in the foregoing method embodiment. For example, the processing module 501 measures the to-be-measured transmission point based on the positioning assistance information, to obtain a measurement result, where the measurement result includes positioning reference signal information of the to-be-measured transmission point.

The sending module 502 may be configured to perform step 403 or step 406 in the foregoing method embodiment. For example, the sending module 502 sends the measurement result.

Optionally, the terminal 500 further includes a storage module 504. The storage module 504 is coupled to the processing module, so that the processing module 501 can execute a computer-executable instruction stored in the storage module 504, to implement functions of the terminal in the foregoing method embodiment. In an example, the storage module 504 optionally included in the terminal 500 may be a storage unit in a chip, for example, a register or a cache. The storage module 504 may alternatively be a storage unit outside a chip, for example, a read-only memory (ROM), another type of static storage device that can store static information and an instruction, or a random access memory (RAM).

It should be understood that a procedure performed between the modules of the terminal in the embodiment corresponding to FIG. 5 is similar to the procedure performed by the terminal in the method embodiment corresponding to FIG. 4, and details are not described herein again.

Figure 6:
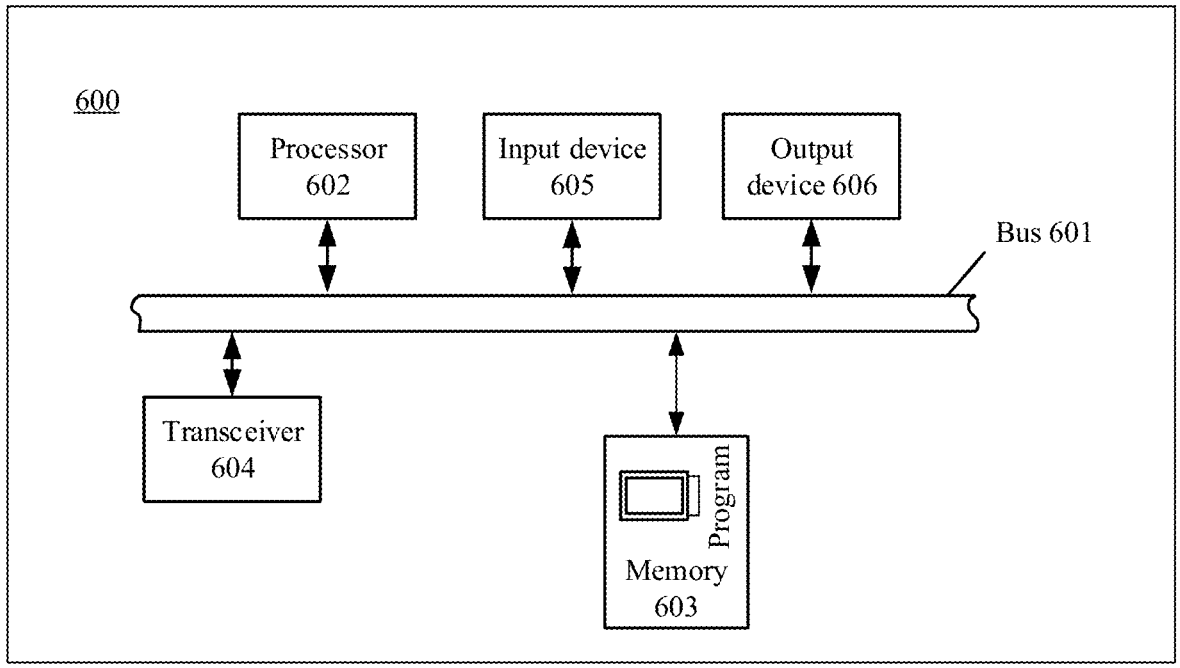
FIG. 6 is a schematic diagram of another embodiment of a terminal according to an embodiment of this application.

FIG. 6 is a possible schematic structural diagram of a terminal 600 in the foregoing embodiment. The terminal 600 may be configured as the foregoing terminal. The terminal 600 may include a processor 602, a computer-readable storage medium/memory 603, a transceiver 604, an input device 605, an output device 606, and a bus 601. The processor, the transceiver, the computer-readable storage medium, and the like are connected by using the bus. A specific connection medium between the foregoing components is not limited in this embodiment of this application.

In an example, the transceiver 604 receives positioning assistance information sent by a positioning entity, where the positioning assistance information includes a cell identity of a cell in which a to-be-measured transmission point is located, an identity of the to-be-measured transmission point, and positioning reference signal configuration information of the to-be-measured transmission point. The processor 602 measures the to-be-measured transmission point based on the positioning assistance information, to obtain a measurement result, where the measurement result includes positioning reference signal information of the to-be-measured transmission point.

The transceiver 604 sends the measurement result.

In an example, the processor 602 may include a baseband circuit. For example, the processor 602 may perform processing such as data encapsulation and encoding on the measurement result according to a protocol. The transceiver 604 may include a radio frequency circuit, to perform processing such as modulation and amplification on the measurement result, and then send the measurement result to the positioning entity.

In another example, the processor 602 may run an operating system to control a function between each device and each component. The transceiver 604 may include a baseband circuit and a radio frequency circuit. For example, the transceiver 604 may process the measurement result by using the baseband circuit and the radio frequency circuit, and then send the measurement result to the positioning entity.

The transceiver 604 and the processor 602 may implement corresponding steps in the embodiment shown in FIG. 4. Details are not described herein again.

It may be understood that FIG. 6 shows only a simplified design of the terminal. In actual application, the terminal may include any quantity of transceivers, processors, memories, and the like, and all terminals that can implement this application fall within the protection scope of this application.

The processor 602 in the terminal 600 may be a general-purpose processor, for example, a general-purpose central processing unit (CPU), a network processor (NP), or a microprocessor, or may be an application-specific integrated circuit (ASIC), or one or more integrated circuits configured to control program execution in the solutions of this application. Alternatively, the processor 602 may be a digital signal processor (DSP), a field-programmable gate array (FPGA), another programmable logic device, a discrete gate, a transistor logic device, or a discrete hardware component. Alternatively, the controller/processor may be a combination of processors implementing a computing function, for example, a combination of one or more microprocessors, or a combination of a DSP and a microprocessor. The processor usually performs logical and arithmetic operations based on a program instruction stored in the memory.

The bus 601 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

The computer-readable storage medium/memory 603 may further store an operating system and another application program. Specifically, the program may include program code, and the program code includes a computer operation instruction. More specifically, the memory may be a read-only memory (ROM), another type of static storage device that can store static information and an instruction, a random access memory (RAM), another type of dynamic storage device that can store information and an instruction, a magnetic disk memory, or the like. The memory 603 may be a combination of the foregoing storage types. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in a packaging material.

Alternatively, an embodiment of this application further provides a universal processing system. For example, the universal processing system is usually referred to as a chip. The universal processing system includes one or more microprocessors that provide a processor function, and an external memory that provides at least a part of a storage medium. All these components are connected to another supporting circuit by using an external bus architecture. When an instruction stored in the memory is executed by the processor, the processor is enabled to perform some or all of the steps of the terminal in the positioning method in the embodiment shown in FIG. 4, for example, step 402 to step 406 in FIG. 4 and/or another process used for the technology described in this application.

Method or algorithm steps described in combination with the content disclosed in this application may be implemented by hardware, or may be implemented by a processor executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in user equipment. Certainly, the processor and the storage medium may alternatively exist in the user equipment as discrete components.

Figure 7:
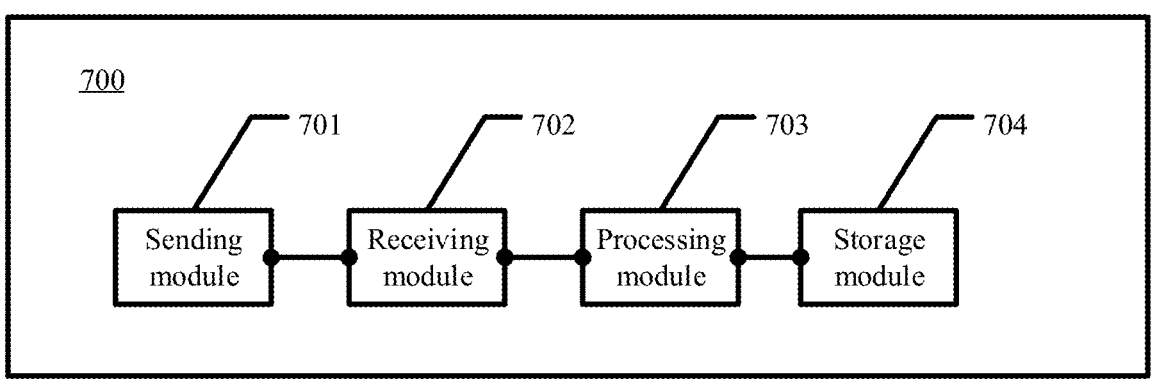
FIG. 7 is a schematic diagram of an embodiment of a serving base station according to an embodiment of this application.

Specifically, referring to FIG. 7, a serving base station 700 in an embodiment of this application includes a sending module 701 and a receiving module 702. The apparatus 700 may be the serving base station in the foregoing method embodiment, or may be one or more chips in the serving base station. The apparatus 700 may be configured to perform some or all functions of the serving base station in the foregoing method embodiment.

For example, the sending module 701 may be configured to perform step 401 in the foregoing method embodiment. For example, the sending module 701 sends positioning assistance information to a positioning entity, where for each transmission point in a transmission point set, the positioning assistance information includes positioning reference signal information of the transmission point and at least one of a cell identity of a cell in which the transmission point is located, an identity of the transmission point, or positioning reference signal configuration information of the transmission point, and the transmission point set includes a transmission point served by the serving base station.

The receiving module 702 may be configured to perform step 403 in the foregoing method embodiment. For example, the receiving module 702 receives a positioning measurement request sent by a terminal, where the positioning measurement request includes measurement gap information.

The sending module 701 may be configured to perform step 404 in the foregoing method embodiment. For example, the sending module 701 sends measurement configuration information to the terminal.

Optionally, the serving base station 700 may further include a processing module 703 that is specifically configured to generate the measurement configuration information based on the measurement gap information.

Optionally, the serving base station 700 further includes a storage module 704. The storage module 704 is coupled to the processing module, so that the processing module can execute a computer-executable instruction stored in the storage module, to implement functions of the serving base station in the foregoing method embodiment. In an example, the storage module 704 optionally included in the serving base station 700 may be a storage unit in a chip, for example, a register or a cache. The storage module 704 may alternatively be a storage unit outside a chip, for example, a read-only memory (ROM), another type of static storage device that can store static information and an instruction, or a random access memory (RAM).

It should be understood that a procedure performed between the modules of the serving base station in the embodiment corresponding to FIG. 7 is similar to the procedure performed by the serving base station in the method embodiment corresponding to FIG. 4, and details are not described herein again.

Figure 8:
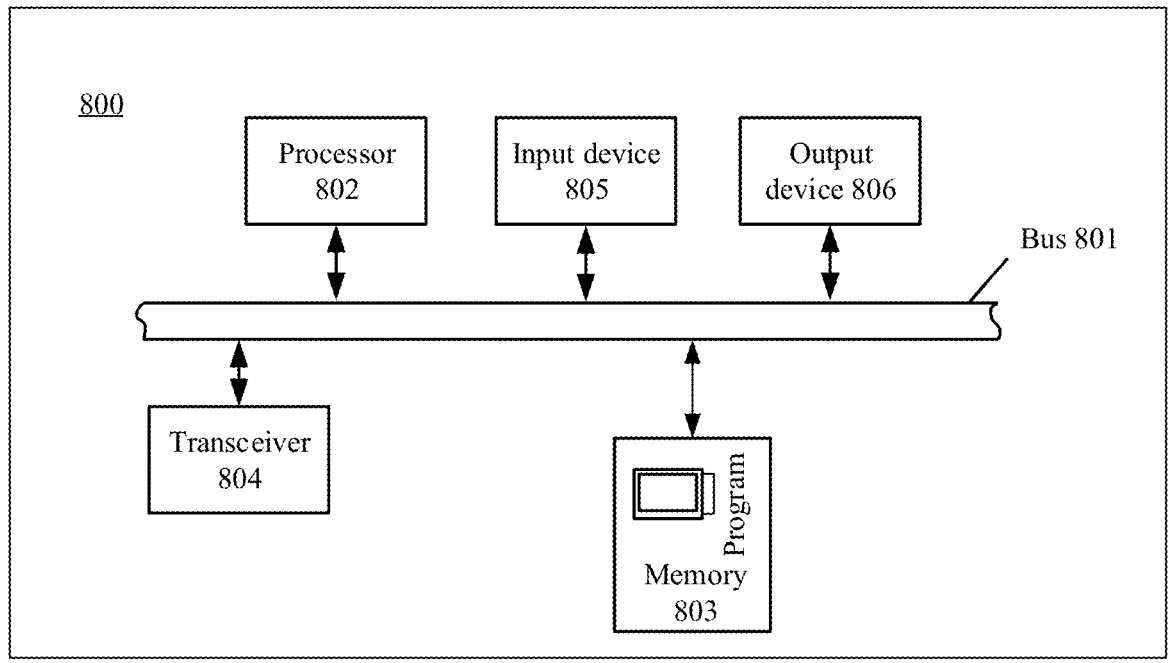
FIG. 8 is a schematic diagram of another embodiment of a serving base station according to an embodiment of this application.

FIG. 8 is a possible schematic structural diagram of a serving base station 800 in the foregoing embodiment. The serving base station 800 may be configured as the foregoing serving base station. The serving base station 800 may include a processor 802, a computer-readable storage medium/memory 803, a transceiver 804, an input device 805, an output device 806, and a bus 801. The processor, the transceiver, the computer-readable storage medium, and the like are connected by using the bus. A specific connection medium between the foregoing components is not limited in this embodiment of this application.

In an example, the transceiver 804 sends positioning assistance information to a positioning entity, where for each transmission point in a transmission point set, the positioning assistance information includes positioning reference signal information of the transmission point and at least one of a cell identity of a cell in which the transmission point is located, an identity of the transmission point, or positioning reference signal configuration information of the transmission point, and the transmission point set includes a transmission point served by the serving base station; receives a positioning measurement request sent by a terminal, where the positioning measurement request includes measurement gap information; and sends measurement configuration information to the terminal.

In an example, the processor 802 may include a baseband circuit. For example, the processor 802 may perform processing such as data encapsulation and encoding on the positioning assistance information or the measurement configuration information according to a protocol. The transceiver 804 may include a radio frequency circuit, to perform processing such as modulation and amplification on the positioning assistance information, and then send the positioning assistance information to the positioning entity, or to perform processing such as modulation and amplification on the measurement configuration information, and then send the measurement configuration information to the terminal.

In another example, the processor 802 may run an operating system to control a function between each device and each component. The transceiver 804 may include a baseband circuit and a radio frequency circuit. For example, the transceiver 804 may process the measurement configuration information by using the baseband circuit and the radio frequency circuit, and then send the measurement configuration information to the terminal.

The transceiver 804 and the processor 802 may implement corresponding steps in the embodiment shown in FIG. 4. Details are not described herein again.

It may be understood that FIG. 8 shows only a simplified design of the serving base station. In actual application, the serving base station may include any quantity of transceivers, processors, memories, and the like, and all serving base stations that can implement this application fall within the protection scope of this application.

The processor 802 in the serving base station 800 may be a general-purpose processor, for example, a general-purpose central processing unit (CPU), a network processor (NP), or a microprocessor, or may be an application-specific integrated circuit (ASIC), or one or more integrated circuits configured to control program execution in the solutions of this application. Alternatively, the processor 802 may be a digital signal processor (DSP), a field-programmable gate array (FPGA), another programmable logic device, a discrete gate, a transistor logic device, or a discrete hardware component. Alternatively, the controller/processor may be a combination of processors implementing a computing function, for example, a combination of one or more microprocessors, or a combination of a DSP and a microprocessor. The processor usually performs logical and arithmetic operations based on a program instruction stored in the memory.

The bus 801 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

The computer-readable storage medium/memory 803 may further store an operating system and another application program. Specifically, the program may include program code, and the program code includes a computer operation instruction. More specifically, the memory may be a read-only memory (ROM), another type of static storage device that can store static information and an instruction, a random access memory (RAM), another type of dynamic storage device that can store information and an instruction, a magnetic disk memory, or the like. The memory 803 may be a combination of the foregoing storage types. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in a packaging material.

Alternatively, an embodiment of this application further provides a universal processing system. For example, the universal processing system is usually referred to as a chip. The universal processing system includes one or more microprocessors that provide a processor function, and an external memory that provides at least a part of a storage medium. All these components are connected to another supporting circuit by using an external bus architecture. When an instruction stored in the memory is executed by the processor, the processor is enabled to perform some or all of the steps of the serving base station in the positioning method in the embodiment shown in FIG. 4, for example, step 401, step 403, or step 404 in FIG. 4 and/or another process used for the technology described in this application.

Method or algorithm steps described in combination with the content disclosed in this application may be implemented by hardware, or may be implemented by a processor executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in user equipment. Certainly, the processor and the storage medium may alternatively exist in the user equipment as discrete components.

Figure 9:
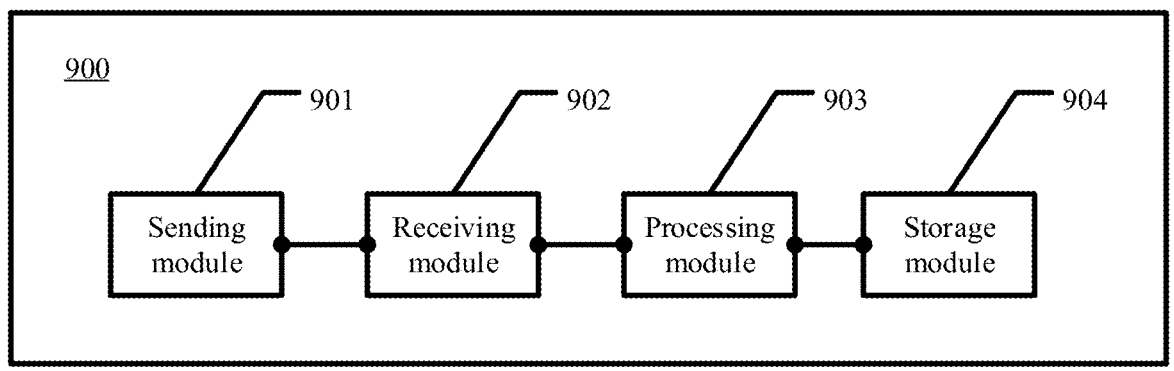
FIG. 9 is a schematic diagram of an embodiment of a positioning entity according to an embodiment of this application.

Specifically, referring to FIG. 9, a positioning apparatus 900 in an embodiment of this application includes a sending module 901, a receiving module 902, and a processing module 903. The apparatus 900 may be the positioning entity in the foregoing method embodiment, or may be one or more chips in the positioning entity. The positioning entity 900 may be configured to perform some or all functions of the positioning entity in the foregoing method embodiment.

For example, the sending module 901 may be configured to perform step 402 in the foregoing method embodiment. For example, the sending module 901 sends first positioning assistance information to a terminal, where the first positioning assistance information includes a cell identity of a cell in which a to-be-measured transmission point is located, an identity of the to-be-measured transmission point, and positioning reference signal configuration information of the to-be-measured transmission point.

The receiving module 902 may be configured to perform step 406 in the foregoing method embodiment. For example, the receiving module 902 receives a measurement result, where the measurement result includes first positioning reference signal information of the to-be-measured transmission point.

The processing module 903 may be configured to perform step 407 in the foregoing method embodiment.

Optionally, the positioning entity apparatus 900 may further include: the processing module 903, and the processing module 903 may determine position information of the terminal based on the measurement result.

Optionally, the apparatus 900 further includes a storage module 904. The storage module 904 is coupled to the processing module 903, so that the processing module 903 can execute a computer-executable instruction stored in the storage module 904, to implement functions of the positioning entity in the foregoing method embodiment. In an example, the storage module 904 optionally included in the apparatus 900 may be a storage unit in a chip, for example, a register or a cache. The storage module may alternatively be a storage unit outside a chip, for example, a read-only memory (ROM for short), another type of static storage device that can store static information and an instruction, or a random access memory (RAM for short).

It should be understood that a procedure performed between the modules of the positioning apparatus in the embodiment corresponding to FIG. 9 is similar to the procedure performed by the positioning entity in the method embodiment corresponding to FIG. 4, and details are not described herein again.

Figure 10:
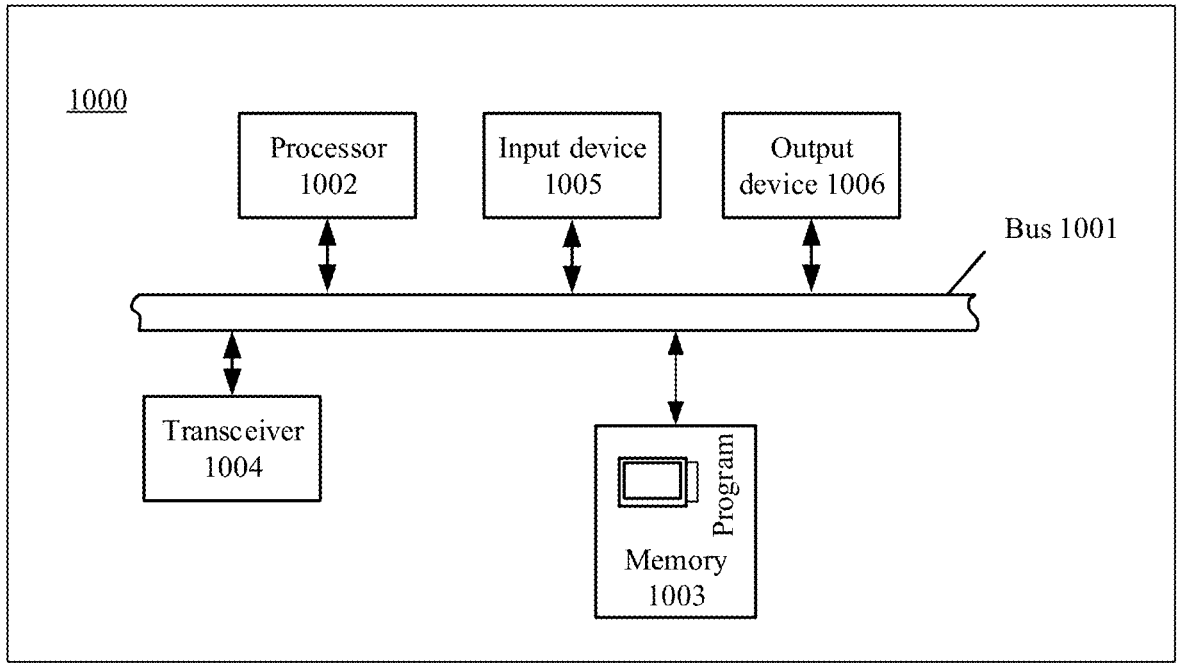
FIG. 10 is a schematic diagram of another embodiment of a positioning entity according to an embodiment of this application.

FIG. 10 is a possible schematic structural diagram of a positioning apparatus 1000 in the foregoing embodiment. The apparatus 1000 may be configured as the foregoing positioning entity. The apparatus 1000 may include a processor 1002, a computer-readable storage medium/memory 1003, a transceiver 1004, an input device 1005, an output device 1006, and a bus 1001. The processor, the transceiver, the computer-readable storage medium, and the like are connected by using the bus. A specific connection medium between the foregoing components is not limited in this embodiment of this application.

In an example, the transceiver 1004 sends first positioning assistance information to a terminal, where the first positioning assistance information includes a cell identity of a cell in which a to-be-measured transmission point is located, an identity of the to-be-measured transmission point, and positioning reference signal configuration information of the to-be-measured transmission point; and receives a measurement result, where the measurement result includes first positioning reference signal information of the to-be-measured transmission point. The processor 1002 determines position information of the terminal based on the measurement result.

In an example, the processor 1002 may include a baseband circuit. For example, the processor 1002 may calculate the position information of the terminal based on the measurement result. The transceiver 1004 may include a radio frequency circuit, to perform processing such as modulation and amplification on the first positioning assistance information, and then send the first positioning assistance information to the terminal.

In another example, the processor 1002 may run an operating system to control a function between each device and each component. The transceiver 1004 may include a baseband circuit and a radio frequency circuit. For example, the transceiver 1004 may process the first positioning assistance information by using the baseband circuit and the radio frequency circuit, and then send the first positioning assistance information to the terminal.

The transceiver 1004 and the processor 1002 may implement corresponding steps in the embodiment shown in FIG. 4. Details are not described herein again.

It may be understood that FIG. 10 shows only a simplified design of the positioning entity. In actual application, the positioning entity may include any quantity of transceivers, processors, memories, and the like, and all positioning entities that can implement this application fall within the protection scope of this application.

The processor 1002 in the apparatus 1000 may be a general-purpose processor, for example, a general-purpose central processing unit (CPU), a network processor (NP), or a microprocessor, or may be an application-specific integrated circuit (ASIC), or one or more integrated circuits configured to control program execution in the solutions of this application. Alternatively, the processor 1002 may be a digital signal processor (DSP), a field-programmable gate array (FPGA), another programmable logic device, a discrete gate, a transistor logic device, or a discrete hardware component. Alternatively, the controller/processor may be a combination of processors implementing a computing function, for example, a combination of one or more microprocessors, or a combination of a DSP and a microprocessor. The processor usually performs logical and arithmetic operations based on a program instruction stored in the memory.

The bus 1001 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 10, but this does not mean that there is only one bus or only one type of bus.

The computer-readable storage medium/memory 1003 may further store an operating system and another application program. Specifically, the program may include program code, and the program code includes a computer operation instruction. More specifically, the memory may be a read-only memory (ROM), another type of static storage device that can store static information and an instruction, a random access memory (RAM), another type of dynamic storage device that can store information and an instruction, a magnetic disk memory, or the like. The memory 1003 may be a combination of the foregoing storage types. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in a packaging material.

Alternatively, an embodiment of this application further provides a universal processing system. For example, the universal processing system is usually referred to as a chip. The universal processing system includes one or more microprocessors that provide a processor function, and an external memory that provides at least a part of a storage medium. All these components are connected to another supporting circuit by using an external bus architecture. When an instruction stored in the memory is executed by the processor, the processor is enabled to perform some or all of the steps of the positioning entity in the positioning method in the embodiment shown in FIG. 4, for example, step 402, step 406, or step 407 in FIG. 4 and/or another process used for the technology described in this application.

Method or algorithm steps described in combination with the content disclosed in this application may be implemented by hardware, or may be implemented by a processor executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in user equipment. Certainly, the processor and the storage medium may alternatively exist in the user equipment as discrete components.

An embodiment of this application further provides a communications apparatus, and the communications apparatus may be a terminal or a circuit. The communications apparatus may be configured to perform an action performed by the terminal in the foregoing method embodiment.

Figure 11:
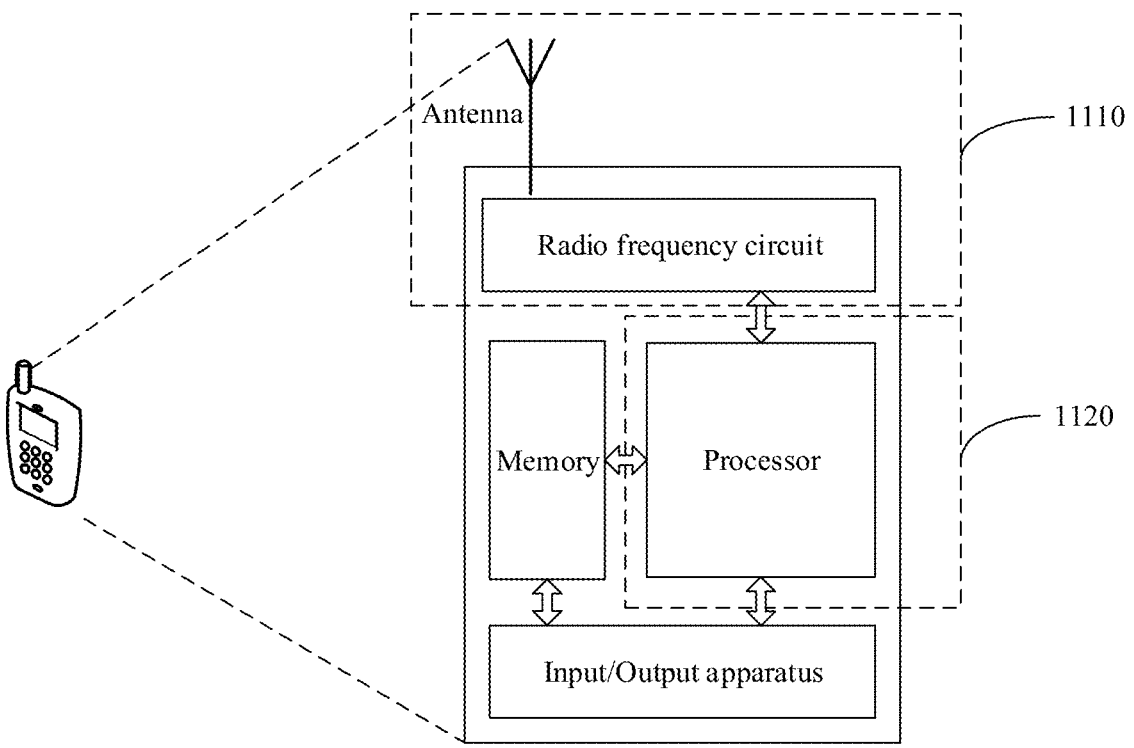
FIG. 11 is a schematic block diagram of a communications apparatus according to an embodiment of this application.

When the communications apparatus is a terminal, FIG. 11 is a simplified schematic structural diagram of the terminal device. For ease of understanding and illustration, an example in which the terminal is a mobile phone is used in FIG. 11. As shown in FIG. 11, the terminal includes a processor, a memory, a radio frequency circuit, an antenna, and an input/output apparatus. The processor is mainly configured to: process a communications protocol and communication data, and control the terminal to execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display screen, or a keyboard, is mainly configured to receive data entered by a user and output data to the user. It should be noted that some types of terminals may not have an input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal, and the processor that has a processing function may be considered as a processing unit of the terminal. As shown in FIG. 11, the terminal includes a transceiver unit 1110 and a processing unit 1120. The transceiver unit may also be referred to as a transceiver, a transceiver, a transceiver apparatus, or the like. The processing unit may also be referred to as a processor, a processing board, a processing module, a processing apparatus, or the like. Optionally, a component for implementing a receiving function in the transceiver unit 1110 may be considered as a receiving unit, and a component for implementing a sending function in the transceiver unit 1110 may be considered as a sending unit. In other words, the transceiver unit 1110 includes the receiving unit and the sending unit. The transceiver unit may also be sometimes referred to as a transceiver, a transceiver, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like.

It should be understood that the transceiver unit 1110 is configured to perform a sending operation and a receiving operation on a terminal side in the foregoing method embodiment, and the processing unit 1120 is configured to perform an operation other than the receiving/sending operation of the terminal in the foregoing method embodiment.

For example, in an implementation, the transceiver unit 1110 is configured to perform the receiving operation on the terminal side in step 403 in FIG. 4, and/or the transceiver unit 1110 is further configured to perform another receiving/sending step on the terminal side in the embodiments of this application. The processing unit 1120 is configured to perform step 405 in FIG. 4, and/or the processing unit 1120 is further configured to perform another processing step on the terminal side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 12:
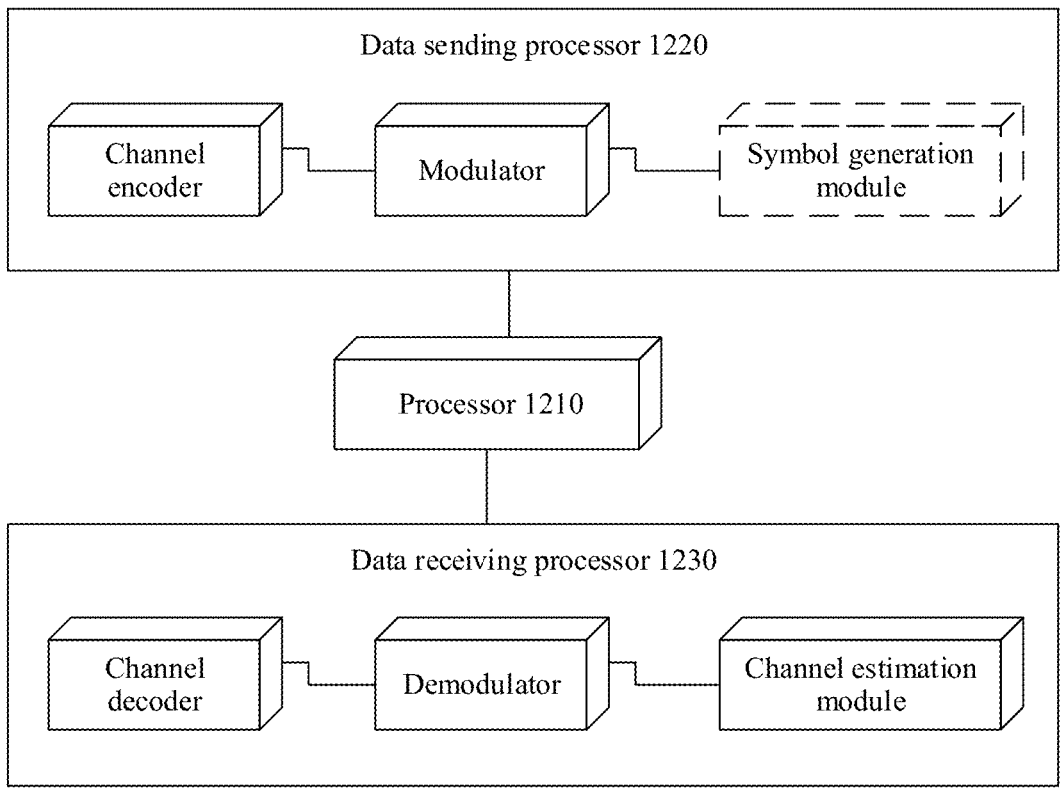
FIG. 12 is another schematic block diagram of a communications apparatus according to an embodiment of this application.

When the communications apparatus in this embodiment is a terminal, reference may be made to a device shown in FIG. 12. In an example, the device can implement a function similar to that of the processor 602 in FIG. 6. In FIG. 12, the device includes a processor 1210, a data sending processor 1220, and a data receiving processor 1230. The processing module 501 in the foregoing embodiment may be the processor 1210 in FIG. 12, and implements a corresponding function. The receiving module 503 and the sending module 502 in the foregoing embodiment may be the data sending processor 1220 and/or the data receiving processor 1230 in FIG. 12. Although FIG. 12 shows a channel encoder and a channel decoder, it may be understood that the modules are merely examples, and do not constitute a limitation on this embodiment.

Figure 13:
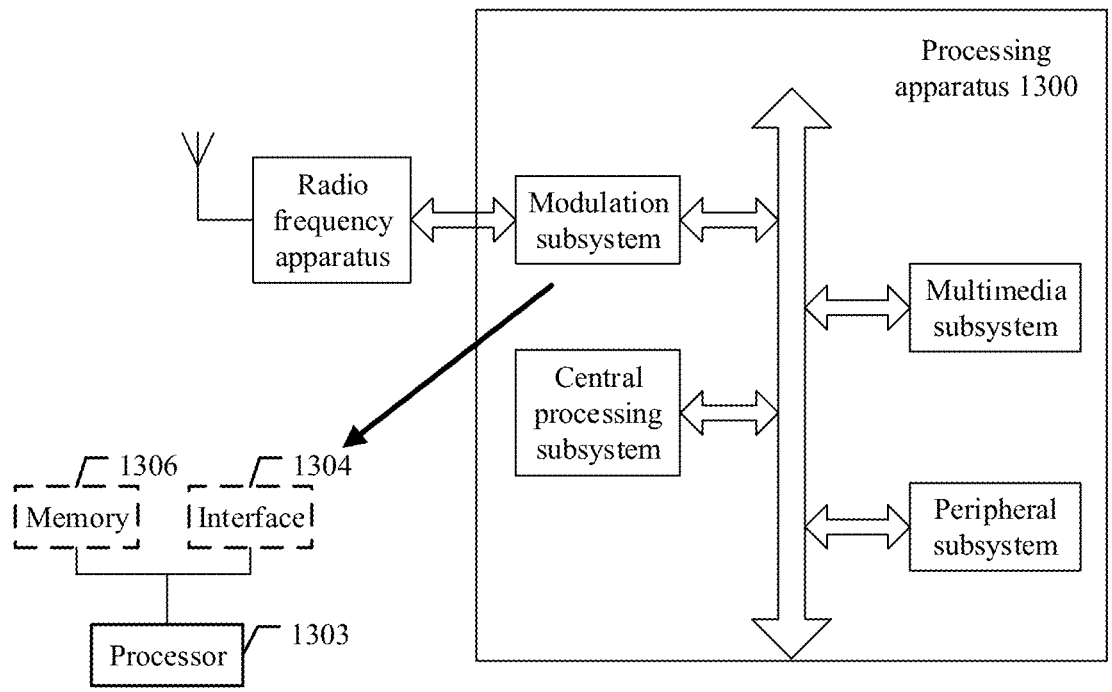
FIG. 13 is still another schematic block diagram of a communications apparatus according to an embodiment of this application.

FIG. 13 shows another form of this embodiment. A processing apparatus 1300) includes modules such as a modulation subsystem, a central processing subsystem, and a peripheral subsystem. The communications apparatus in the embodiments may be used as the modulation subsystem in the processing apparatus. Specifically, the modulation subsystem may include a processor 1303 and an interface 1304. The processor 1303 implements a function of the processing module 501, and the interface 1304 implements functions of the receiving module 503 and the sending module 502. In another variation, the modulation subsystem includes a memory 1306, a processor 1303, and a program that is stored in the memory 1306 and that can be run on the processor. When executing the program, the processor 1303 implements the method on the terminal side in the foregoing method embodiment. It should be noted that the memory 1306 may be a non-volatile memory, or may be a volatile memory. The memory 1306 may be located in the modulation subsystem, or may be located in the processing apparatus 1300, provided that the memory 1306 can be connected to the processor 1303.

In another form of this embodiment, a computer-readable storage medium is provided. The computer-readable storage medium stores an instruction. When the instruction is executed, the method on the terminal side in the foregoing method embodiment is performed. In another form of this embodiment, a computer program product that includes an instruction is provided. When the instruction is executed, the method on the terminal side in the foregoing method embodiment is performed.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A positioning method comprising:
   receiving, by a terminal, positioning assistance information from a positioning entity, wherein the positioning assistance information is associated with to-be-measured transmission points, and wherein, for each of the to-be-measured transmission points, the positioning assistance information comprises an identity of a cell in which the to-be-measured transmission point is located, an identity of the to-be-measured transmission point located in the cell, and positioning reference signal configuration information of the to-be-measured transmission point;

measuring, by the terminal, a positioning reference signal from each of the to-be-measured transmission points, based on the positioning assistance information, to obtain a measurement result, wherein the measurement result comprises positioning reference signal information of the to-be-measured transmission points, and wherein the positioning reference signal information is-includes beam information comprising number information of the positioning reference signals for determining a position of the terminal; and sending, by the terminal, the measurement result to the positioning entity;

wherein the method further comprises: receiving, by the positioning entity, second positioning assistance information from a serving base station, wherein for each transmission point in a transmission point set, the second positioning assistance information comprises second positioning reference signal information of the transmission point and at least one of an identity of a cell in which the transmission point is located, an identity of the transmission point, or positioning reference signal configuration information of the transmission point, and wherein the transmission point set comprises a transmission point served by the serving base station.

2. The method according to claim 1, wherein the positioning reference signal information includes at least one of:
   direction information of the positioning reference signals, or
   angle of arrival information of the positioning reference signals.

3. The method according to claim 1, wherein the positioning reference signal configuration information comprises at least one of a periodicity, a frequency domain position, a time domain position, or code domain information of a positioning reference signal.

4. The method according to claim 1, wherein measuring the positioning reference signal from each of the to-be-measured transmission points
   is further based on measurement configuration information, wherein the measurement configuration information is configured by the serving base station after obtaining measurement gap information reported by the terminal.

5. The method according to claim 4, wherein the measurement gap information comprises:
   a measurement periodicity and a measurement offset value,
   the measurement periodicity and a measurement time length, or
   the measurement offset value and the measurement time length.

6. The method according to claim 1, wherein the positioning reference signal information includes geographical position information of the to-be-measured transmission points.

7. A system comprising:
   one or more processors; and
   one or more non-transitory storage mediums configured to store program instructions;
   wherein the instructions, when executed by the one or more processors, facilitate performance of the following by the system:

receiving, by a terminal, positioning assistance information from a positioning entity, wherein the positioning assistance information is associated with to-be-measured transmission points, and wherein, for each of the to-be-measured transmission points, the positioning assistance information comprises an identity of a cell in which the to-be-measured transmission point is located, an identity of the to-be-measured transmission point located in the cell, and positioning reference signal configuration information of the to-be-measured transmission point;

measuring, by the terminal, a positioning reference signal from each of the to-be-measured transmission points based on the positioning assistance information to obtain a measurement result, wherein the measurement result comprises positioning reference signal information of the to-be-measured transmission points, and wherein the positioning reference signal information includes beam information comprising number information of the positioning reference signals for determining a position of the terminal; and sending, by the terminal, the measurement result to the positioning entity;

wherein the instructions, when executed by the one or more processors, further facilitate performance of the following by the system:

receiving, by the positioning entity, second positioning assistance information from a serving base station, wherein for each transmission point in a transmission point set, the second positioning assistance information comprises second positioning reference signal information of the transmission point and at least one of an identity of a cell in which the transmission point is located, an identity of the transmission point, or positioning reference signal configuration information of the transmission point, and wherein the transmission point set comprises a transmission point served by the serving base station.

8. The system according to claim 7, wherein the positioning reference signal information includes at least one of:
   direction information of the positioning reference signals, or
   angle of arrival information of the positioning reference signals.

9. The system according to claim 7, wherein the positioning reference signal configuration information comprises at least one of a periodicity, a frequency domain position, a time domain position, or code domain information of a positioning reference signal.

10. The system according to claim 7, wherein measuring the positioning reference signal from each of the to-be-measured transmission points is further based on measurement configuration information, wherein the measurement configuration information is configured by the serving base station after obtaining measurement gap information reported by the terminal.

11. The system according to claim 10, wherein the measurement gap information comprises:
    a measurement periodicity and a measurement offset value,
    the measurement periodicity and a measurement time length, or
    the measurement offset value and the measurement time length.

12. The apparatus according to claim 7, wherein the positioning reference signal information includes geographical position information of the to-be-measured transmission points.

13. A positioning method comprising:
sending, by a positioning entity, first positioning assistance information to a terminal, wherein the first positioning assistance information is associated with to-be-measured transmission points, and wherein, for each of the to-be-measured transmission points, the first positioning assistance information comprises an identity of a cell in which a to-be-measured transmission point is located, an identity of the to-be-measured transmission point, and positioning reference signal configuration information of the to-be-measured transmission point;
receiving, by the positioning entity, a measurement result comprising first positioning reference signal information, wherein the first positioning reference signal information is includes beam information comprising number information of a positioning reference signal of one of the to-be-measured transmission points, and wherein the number information of the positioning reference signal is used to determine position information of the terminal; and
determining, by the positioning entity, the position information of the terminal based on the measurement result;
wherein the method further comprises: receiving, by the positioning entity, second positioning assistance information from a serving base station, wherein for each transmission point in a transmission point set, the second positioning assistance information comprises second positioning reference signal information of the transmission point and at least one of an identity of a cell in which the transmission point is located, an identity of the transmission point, or positioning reference signal configuration information of the transmission point, and wherein the transmission point set comprises a transmission point served by the serving base station.

14. The method according to claim 13, wherein the first positioning reference signal information comprises:
at least one of direction information of the positioning reference signal, or angle of arrival information of the positioning reference signal; and
wherein the second positioning reference signal information comprises:
number information of a positioning reference signal; and
at least one of direction information of the positioning reference signal, angle of arrival information of the positioning reference signal, or geographical position information of the positioning reference signal.

15. An apparatus comprising:
one or more processors; and
a non-transitory storage medium configured to store program instructions;
wherein the instructions, when executed by the one or more processors, facilitate performance of the following by the apparatus:
sending first positioning assistance information to a terminal, wherein the first positioning assistance information is associated with to-be-measured transmission points, and wherein, for each of the to-be-measured transmission points, the first positioning assistance information comprises an identity of a cell in which a to-be-measured transmission point is located, an identity of the to-be-measured transmission point, and positioning reference signal configuration information of the to-be-measured transmission point;
receiving a measurement result comprising first positioning reference signal information, wherein the first positioning reference signal information includes beam information comprising number information of a positioning reference signal of one of the to-be-measured transmission points, and wherein the number information of the positioning reference signal is usable to determine position information of the terminal; and
determining the position information of the terminal based on the measurement result;
wherein the instructions, when executed by the one or more processors, further facilitate performance of the following by the apparatus:
receiving second positioning assistance information from a serving base station, wherein for each transmission point in a transmission point set, the second positioning assistance information comprises second positioning reference signal information of the transmission point and at least one of an identity of a cell in which the transmission point is located, an identity of the transmission point, or positioning reference signal configuration information of the transmission point, and wherein the transmission point set comprises a transmission point served by the serving base station.

16. The apparatus according to claim 15, wherein the first positioning reference signal information comprises at least one of:
direction information of the positioning reference signal, or
angle of arrival information of the positioning reference signal; and
wherein the second positioning reference signal information comprises;
number information of a positioning reference signal; and
at least one of direction information of the positioning reference signal, angle of arrival information of the positioning reference signal, or geographical position information of the positioning reference signal.

* * * * *

UNITED STATES PATENT AND TRADEMARK OFFICE
CERTIFICATE OF CORRECTION

| | |
|---|---|
| PATENT NO. | : 12,127,072 B2 |
| APPLICATION NO. | : 17/214457 |
| DATED | : October 22, 2024 |
| INVENTOR(S) | : Chen et al. |

Page 1 of 1

It is certified that error appears in the above-identified patent and that said Letters Patent is hereby corrected as shown below:

In the Claims

Claim 1: Column 29, Line 11: "is-includes beam information comprising number" should read as -- includes beam information comprising number --.

Claim 13: Column 31, Line 19: "information is includes beam information comprising" should read as -- information includes beam information comprising --.

Claim 16: Column 32, Line 50: "tion comprises;" should read as -- tion comprises: --.

Signed and Sealed this
Twenty-seventh Day of May, 2025

Coke Morgan Stewart
*Acting Director of the United States Patent and Trademark Office*